United States Patent [19]

Stevens et al.

[11] Patent Number: 5,485,691
[45] Date of Patent: Jan. 23, 1996

[54] APPARATUS FOR EXCAVATING AND TRANSPLANTING TREES AND THE LIKE AND METHOD OF USE

[75] Inventors: Timothy J. Stevens, Minnetonka; David J. Kruskopf, Mound, both of Minn.

[73] Assignee: EasyMove, Inc., Maple Plain, Minn.

[21] Appl. No.: 296,059

[22] Filed: Aug. 24, 1994

[51] Int. Cl.⁶ .................................................. A01G 23/02
[52] U.S. Cl. .................................................. 37/302; 111/101
[58] Field of Search .......................... 37/301, 302, 303; 111/100, 101, 102, 105, 106, 107

[56] References Cited

U.S. PATENT DOCUMENTS

| | | | |
|---|---|---|---|
| 2,740,234 | 3/1952 | Van Norman | 47/37 |
| 3,017,719 | 1/1962 | Sigler et al. | 37/302 X |
| 3,191,982 | 1/1962 | Goalard | 294/70 |
| 3,319,988 | 1/1965 | Smith | 294/50.8 |
| 3,364,601 | 1/1966 | Korenek | 37/2 |
| 3,460,277 | 12/1969 | Grover et al. | 37/2 |
| 3,713,234 | 9/1970 | Grover et al. | 37/2 R |
| 3,936,960 | 6/1974 | Clegg | 37/2 R |
| 4,226,033 | 10/1980 | Dehaan | 111/101 |
| 4,286,398 | 1/1981 | Lemond et al. | 111/101 |
| 4,351,253 | 9/1982 | Dahlquist | 37/302 X |
| 4,625,662 | 11/1984 | Heinzen | 111/2 |
| 5,081,941 | 3/1990 | Weeks | 111/101 |
| 5,156,101 | 10/1992 | Wien | 101/106 X |

Primary Examiner—Terry Lee Melius
Assistant Examiner—Robert Pezzuto
Attorney, Agent, or Firm—Moore & Hansen

[57] ABSTRACT

An apparatus is provided for excavating small trees, shrubs or flowering plants for relocation and transplanting at another place. The apparatus is wheeled for easy manual relocation, and includes spades that are driven into the ground around the plant to be moved with a large hammer. The apparatus is lightweight to reduce the likelihood of damage to the grounds surrounding the plants to be moved, yet remains capable of moving trees and shrubs of substantial size, and can be conveniently operated by one person.

32 Claims, 26 Drawing Sheets

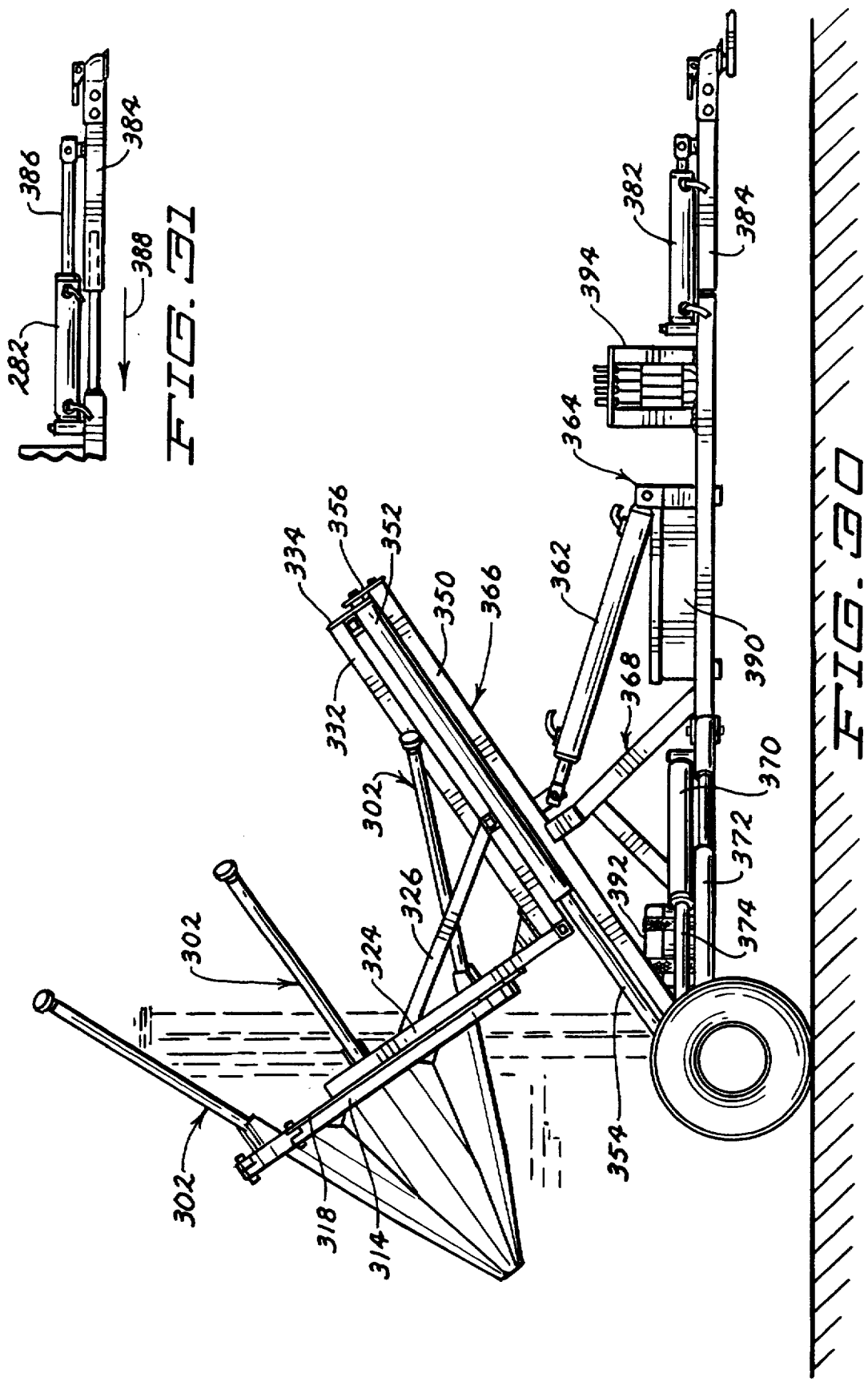

APPARATUS FOR EXCAVATING AND TRANSPLANTING TREES AND THE LIKE AND METHOD OF USE

BACKGROUND OF THE INVENTION

1. Technical Field

The present invention relates generally to landscaping and nursery implements used for excavating trees and shrubs, bailing up the roots thereof and transporting them to be replanted at another location. Specifically, the implements may be operated manually and are generally limited to trees and shrubs of relatively small size.

2. Background Information

Tree moving devices are widely known, and are commonly used by large nurseries or other businesses that frequently plant and mover various trees and shrubberies. These devices, however, are generally designed with the ability to handle trees of a wide variety of sizes, from small trees and medium sized shrubs to more mature trees. These devices, such as that disclosed in U.S. Pat. No. 3,713,234, include complex hydraulics for driving the spades and, as noted in U.S. Pat. No. 3,936,960, can excavate plants having balls of 15 to 24 inches in diameter. Indeed, transplanters are known that can handle trees having balls of up to 54 inches in diameter.

Unfortunately, prior art devices of this type are frequently impractical for or include features unnecessary to the weekend horticulturalist or the start-up landscaper. For these people, there exists a need for a tree moving device that is small enough to handle young trees and shrubs and may be operated manually by one or two people, yet includes features that make it easy to create a ball around the roots of the plant without concern of damage to the plant. Such a device should be simple enough to manufacture for relatively low cost, and may therefore be affordable to individuals or small businesses. Additionally, such a device should also be simple enough to operate that an individual may rent one for a day or a weekend from an implement rental store and be able to operate it without need for complex instructions or training.

Additionally, larger tree excavating machines incorporating hydraulics for driving the spades must be very heavy to successfully drive a large spade into the ground. When the machine is heavy, it may not be easily towed by a garden tractor or four-wheeled all-terrain-vehicle. Additionally, golf courses, which rely heavily on landscaping, can be easily damaged by heavy vehicles, making it difficult to transplant trees and shrubs without damaging fairways with wheel ruts from heavy machinery.

The apparatus for excavating and transplanting trees and the like of the present invention overcomes difficulties described above and affords other features and advantages heretofore not available.

SUMMARY OF THE INVENTION

The preferred embodiment of the present invention is an optionally towable device that may easily be attached to a conventional trailer hitch on an ordinary vehicle such as a light pickup truck or a garden tractor. Alternatively, this embodiment may also be pushed by the operator with the two handles provided on the frame thereof. This embodiment includes four spades mounted to a ring assembly that may be positioned to surround the trunk of a tree or shrub. The spades may be easily driven into the ground by a single person using a hammer that fits over the end of a shaft portion attached to each spade. This embodiment of the tree moving device may form root balls of up to twenty inches in diameter. Nursery standards provide a general rule of thumb concerning the size of a root ball and the corresponding size of the tree that may be handled by a transplanting device. Typically, for every inch in diameter of the tree being moved, there should be provided a root ball twelve inches in diameter. Therefore, a tree having a trunk with a two inch diameter should have a 24 inch ball. Thus the preferred embodiment of the tree moving device can handle trees having a trunk diameter of slightly greater than one and one half inches.

Once the tree has been excavated, it may be lifted from the ground for affixing a bag for retaining The root ball in a position for temporary storage while the tree is being moved. The tree may then be removed from the device and placed in a storage area, or placed in the back of a truck for transportation with several other trees. Alternatively, the tree may be left in the tree mover and taken to a new location for immediate transplanting.

A second embodiment is also mountable to a trailer, and includes six spades for handling slightly larger trees. This embodiment forms root balls of up to 29 inches in diameter, for handling trees of two and a half to three inches in diameter. Since this trailer is larger and more difficult to relocate manually, it includes hydraulically controlled positioning means on the trailer tongue and frame for extending and retracting the ring portion that is positioned about the trunk of the tree or shrub. The use of hydraulics is limited to the positioning apparatus of the trailer, however, and the spades are still manually driven, eliminating the need for the added weight necessary with hydraulically driven spades.

A third embodiment of the device also includes six spades, and is therefore capable of handling trees of the same size as the second embodiment. This version, however, may be mounted to a skid loader. Therefore, it does not include many of the position adjusting features found on other embodiments, such work, being left to the skid loader.

A fourth embodiment is a small, manually positioned device with only two spades forming a ball of only approximately fourteen inches in diameter. This embodiment is particularly well suited to moving very small trees, as well as shrubs and flowers such as rose bushes. It is also small and very maneuverable, and may easily be moved about in areas having a great deal of vegetation.

It is an object of this invention to provide a tree excavating and moving device that may easily be operated by one or two people without extensive instructions or training. It is a further object of this invention to provide a tree excavating and moving device that is simple and inexpensive to manufacture out of commonly available materials and components. It is yet a further object of this invention to provide a tree excavating and moving device that may be easily operated without the need for complex hydraulics, yet that can handle most small to medium size plants, including trees with trunks of up to nearly three inches in diameter. It is yet a further object of this invention to provide a relatively light weight and highly maneuverable tree excavating and moving device that will easily do the job of much heavier and less maneuverable machines.

Other objects and advantages of the invention will become apparent from the following detailed description and from the appended drawings in which like numbers have been used to describe like parts throughout the several views.

BRIEF DESCRIPTION OF THE DRAWINGS

FIG. 30 is a side view of a third embodiment of the subject tree moving device showing the device in towing position;

FIG. 31 is a detail view of the tongue extending apparatus of the third embodiment;

DESCRIPTION OF THE PREFERRED EMBODIMENT

Figure 1:
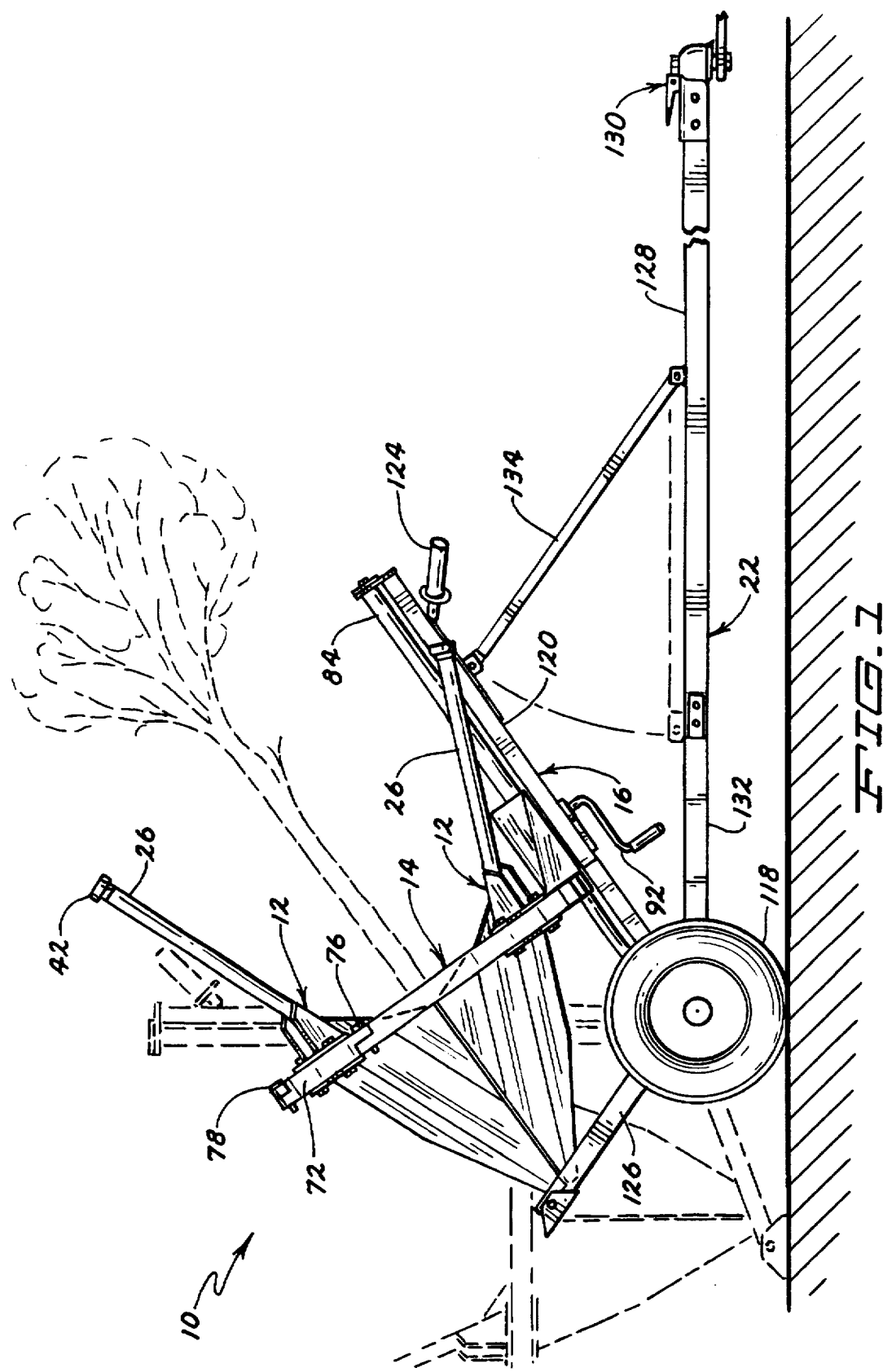
FIG. 1 is a side view of the preferred embodiment of the subject tree moving device showing the trailer in towing position.

With reference to the drawings, and in particular to FIG. 1, the apparatus for excavating and transplanting trees and the like is generally indicated by reference numeral 10. Excavating and transplanting apparatus 10 includes four spade assemblies 12, each of which is mounted to ring assembly 14. Ring assembly 14 is mounted to support structure 16, to which is connected detachable trailer assembly 22.

Figure 10:
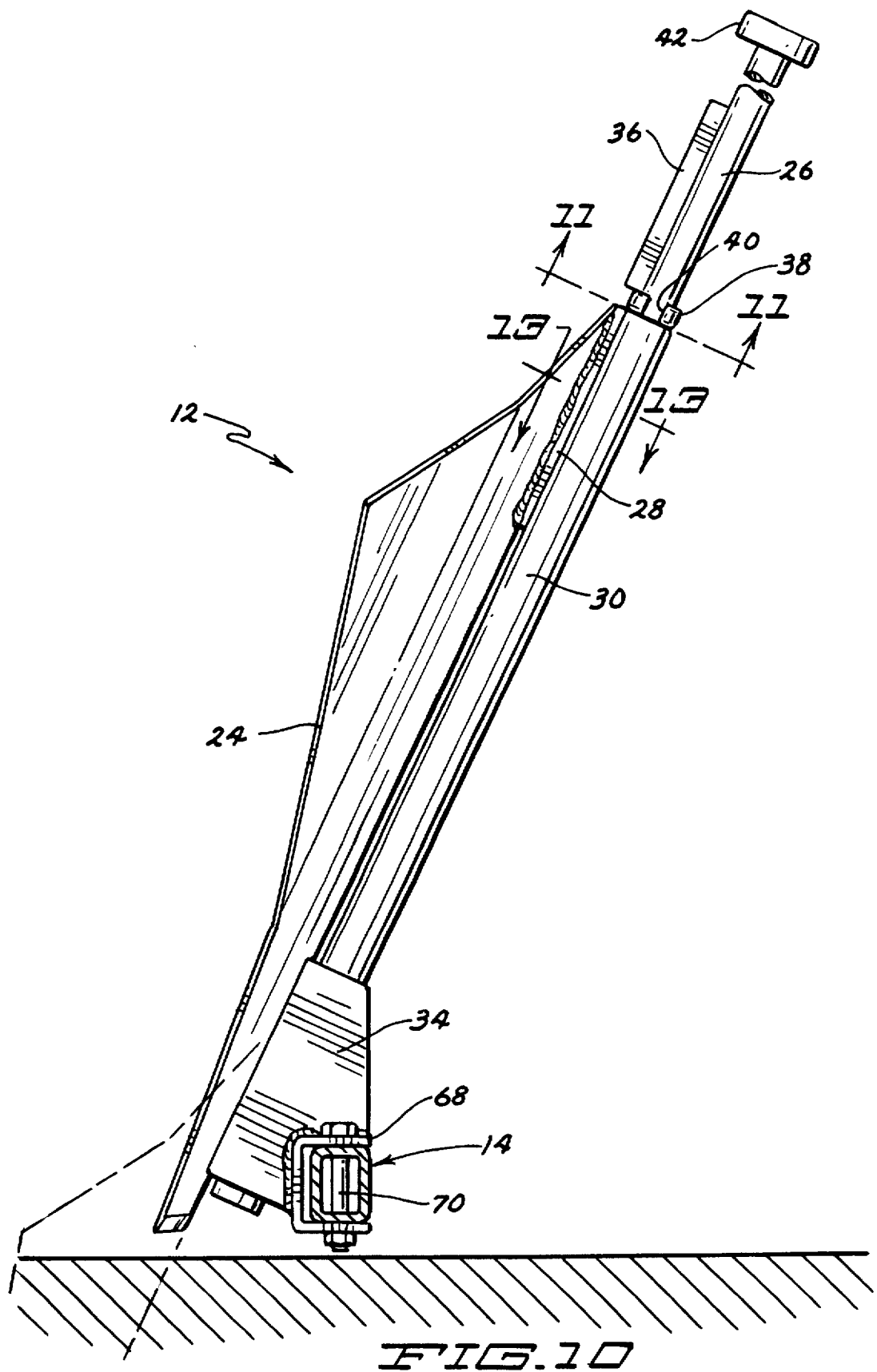
FIG. 10 is a side view of a single spade assembly of the preferred embodiment showing the spade fully retracted.
Figure 11:
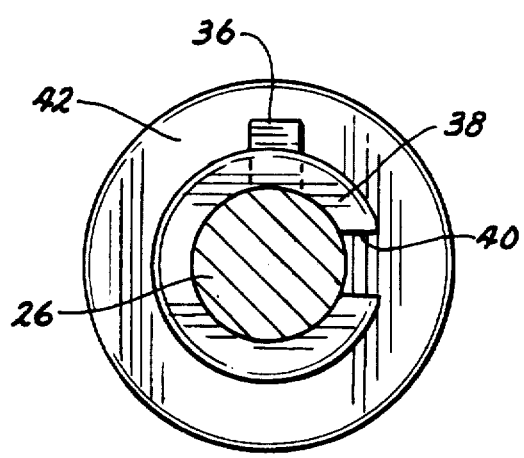
FIG. 11 is a sectional view of the spade assembly of the preferred embodiment taken along line 11—11 of FIG. 10.
Figure 12:
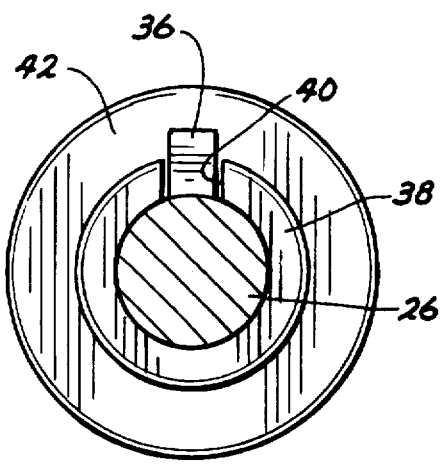
FIG. 12 is a sectional view of the spade assembly of the preferred embodiment similar to that shown in FIG. 11 with the retaining ring positioned to allow driving of the spade into the ground.
Figure 13:
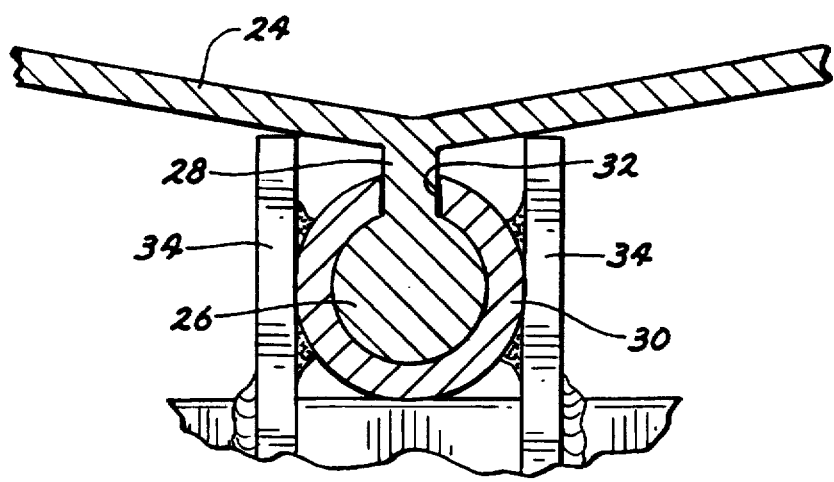
FIG. 13 is a sectional view of the spade assembly of the preferred embodiment taken along line 13—13 of FIG. 10.

As most clearly shown in FIGS. 10–13, each spade assembly 12 includes a spade 24 fixedly mounted to a cylindrical spade arm 26 along spade connector 28, which is welded to both the spade 24 and spade arm 26. Spade arm 26 in turn passes within a hollow, cylindrical spade guide 30, with spade connector 28 passing through a longitudinal slot 32 in spade guide 30. Referring to FIGS. 10 and 13, spade 24 is supported at its upper end by spade connector 28 and at its lower end by a pair of gussets 34, along the edge of which spade 24 slides as it is being driven into and withdrawn from the ground around a tree or shrub. Gussets 34 are welded to spade guide 30.

Along the upper portion of spade arm 26 is attached as by welding a rib member 36 projecting from the spade arm 26.

Rib member 36 passes through slot 32 as spade 24 is driven into the ground. However, when spade 24 is in its fully retracted position, as indicated in FIG. 10, retaining ring 38 acts to secure spade 24 in that position by limiting the motion of the spade in the downward direction by blocking rib member 36 (FIG. 11). Retaining ring 38 includes a cutout 40 therein, and when spade 24 is ready to be driven into the ground, retaining ring 38 is rotated until cutout 40 lines up with rib member 36, allowing rib member 36 to pass therethrough (FIG. 12).

Figure 4:
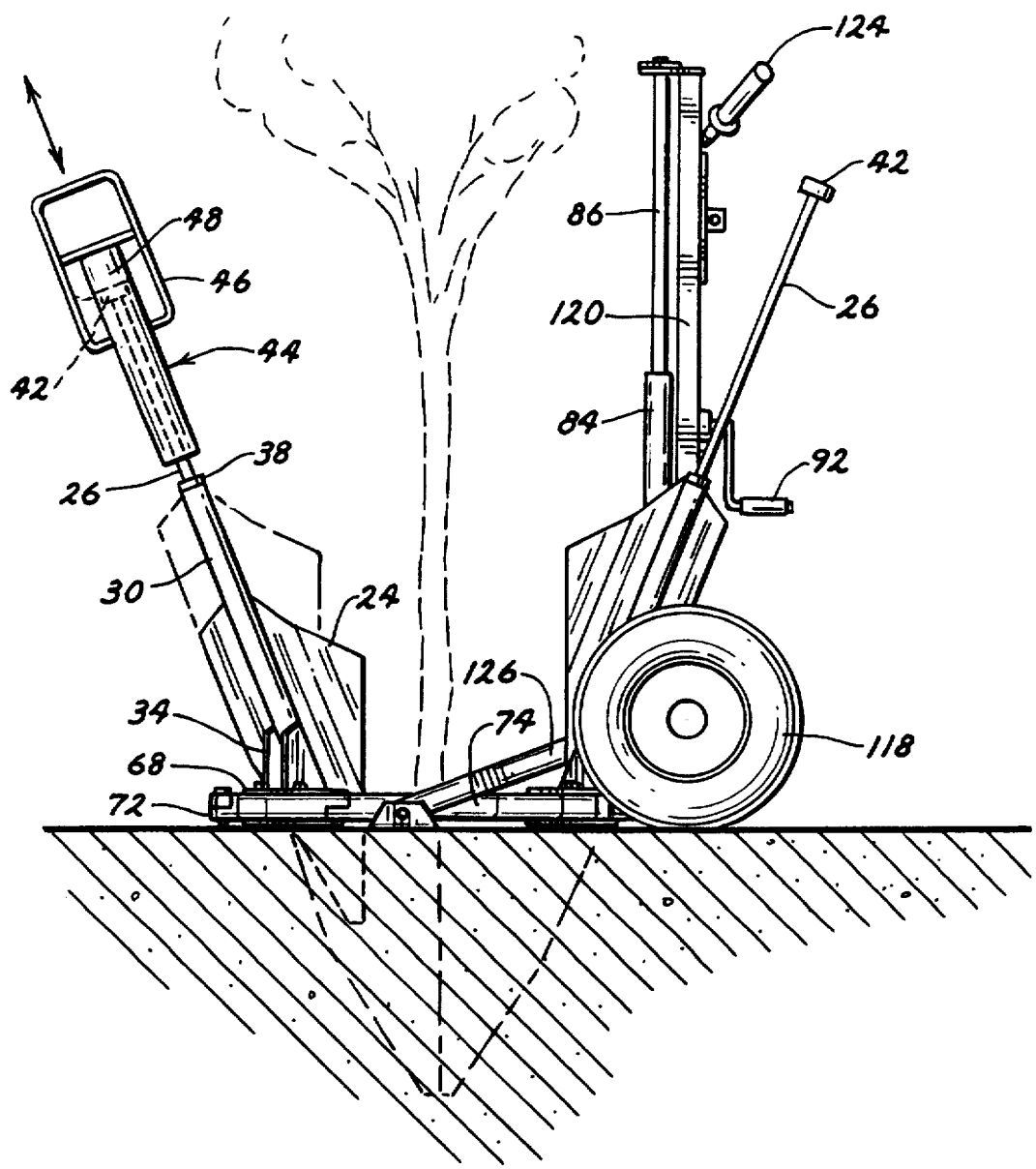
FIG. 4 is a side view of the preferred embodiment with one of the spades partially driven into the ground for removing a plant showing the position of the hammer for driving the spade into the ground.

At the very top end of spade arm 26 is a knob 42 slightly larger in diameter than spade arm 26. Knob 42 is intended to receive the blows from hammer 44 that drive spade 24 into the ground, as best illustrated in FIG. 4. Hammer 44 includes a long handle member 46 that may be gripped by both hands of the user. Preferably, hammer 44 includes a weighted portion 48 to give the hammer added momentum during its downward thrust. The inside diameter of the cylindrical hammer body 50 must be greater than the outside diameter of spade guide 30, as the spade 24 will typically be driven into the soil until knob 42 encounters retaining ring 38.

Figure 14:
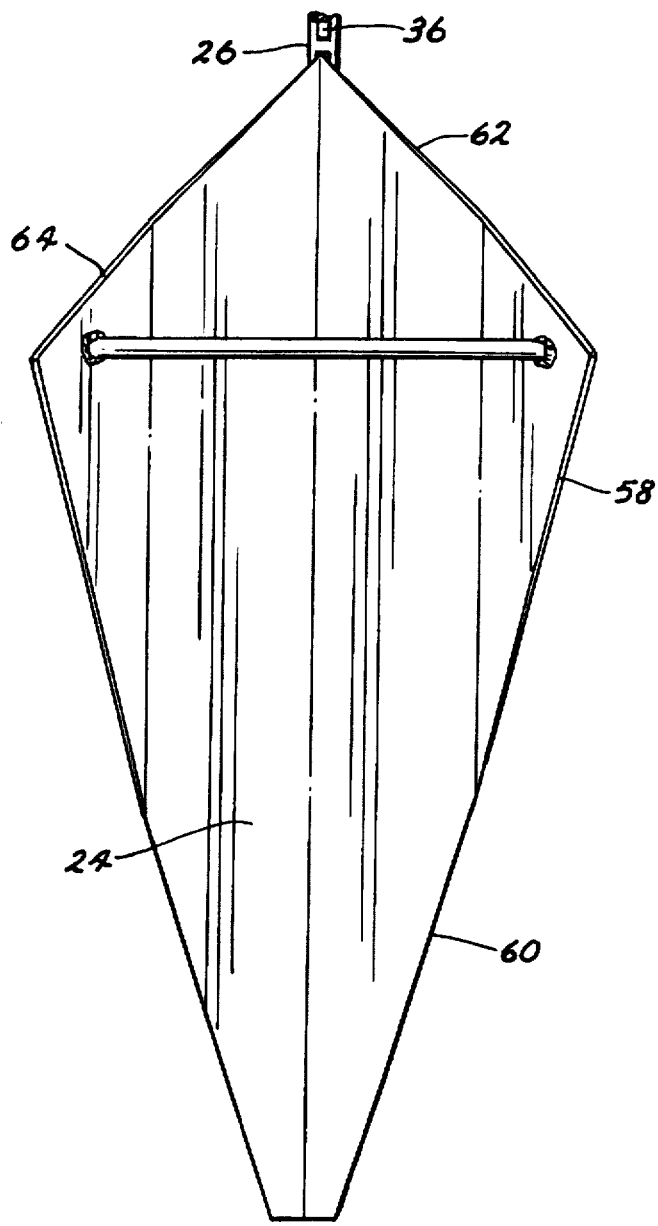
FIG. 14 is a front view of the spade of the preferred embodiment.
Figure 15:
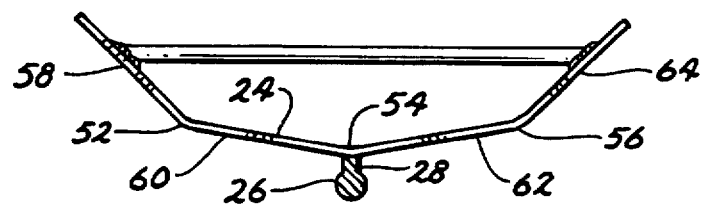
FIG. 15 is a top view of the spade of the preferred embodiment.

Referring to FIGS. 14 and 15, it may be seen that spade 24 includes three parallel break lines 52, 54 and 56 that divide the spade into first, second, third and fourth sections 58, 60, 62, 64, respectively. Rather than tapering and coming together at a point at the end of spade 24, each section 58, 60, 62 and 64 remains vertical, making the spade easier to drive into the ground, since the spade is not required to overcome any resistance tending to cause it to deform. To aid in positioning spade 24, a handle 66 is provided, extending between first spade section 58 and fourth spade section 64.

Figure 2:
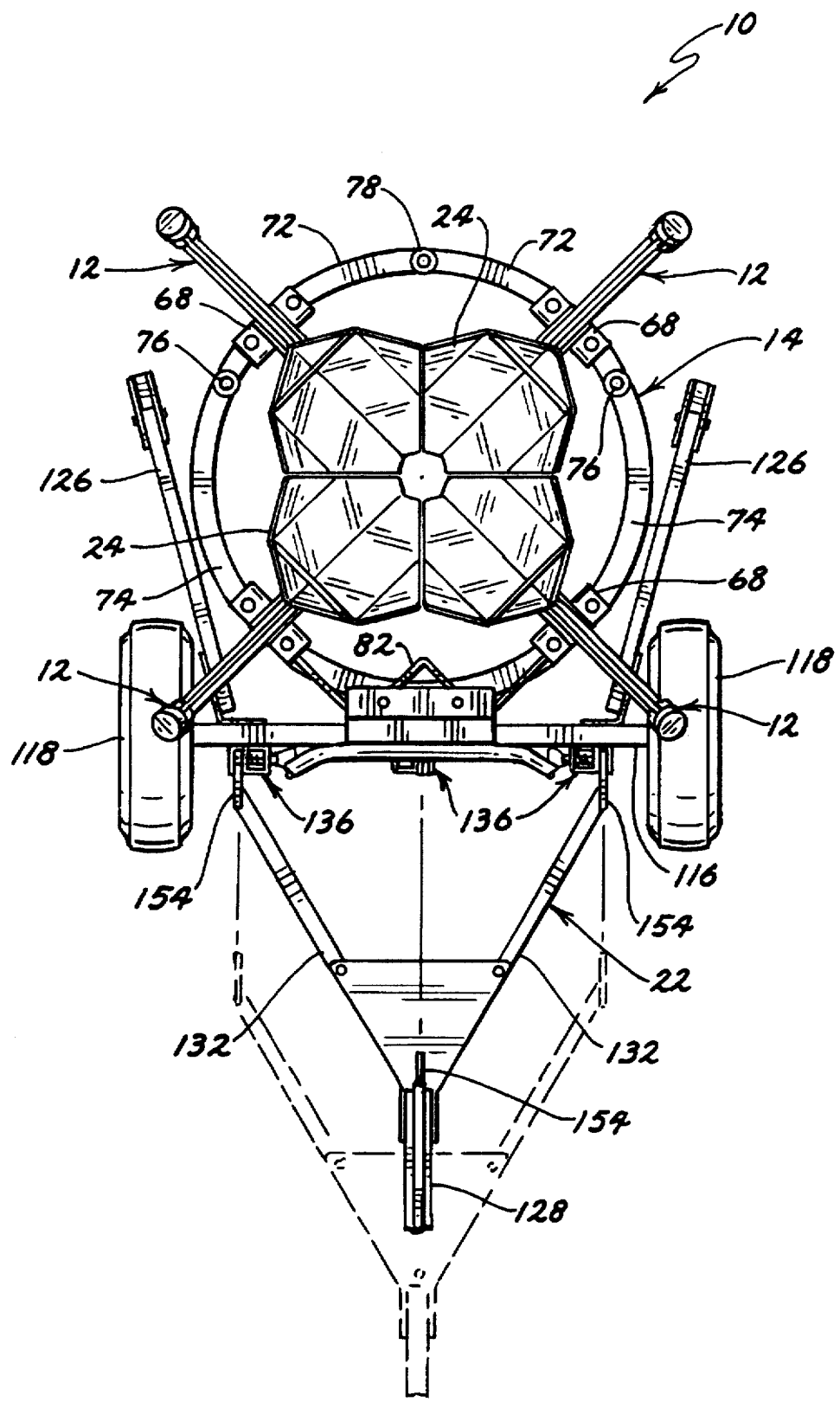
FIG. 2 is a top view of the embodiment shown in FIG. 1 with the spades in their downwardly extending position.

Each spade assembly 12 is mounted to ring assembly 14 with a removable mounting bracket 68, as best seen in FIGS. 2 and 10. Gussets 34 are weldably attached to mounting bracket 68, which fastens to ring assembly 14 with bolts 70. In the event of damage, spade assemblies 12 are easily removed and replaced by simply loosening bolts 70 and replacing the damaged assembly 12 with one having a new mounting bracket 68.

Figure 3:
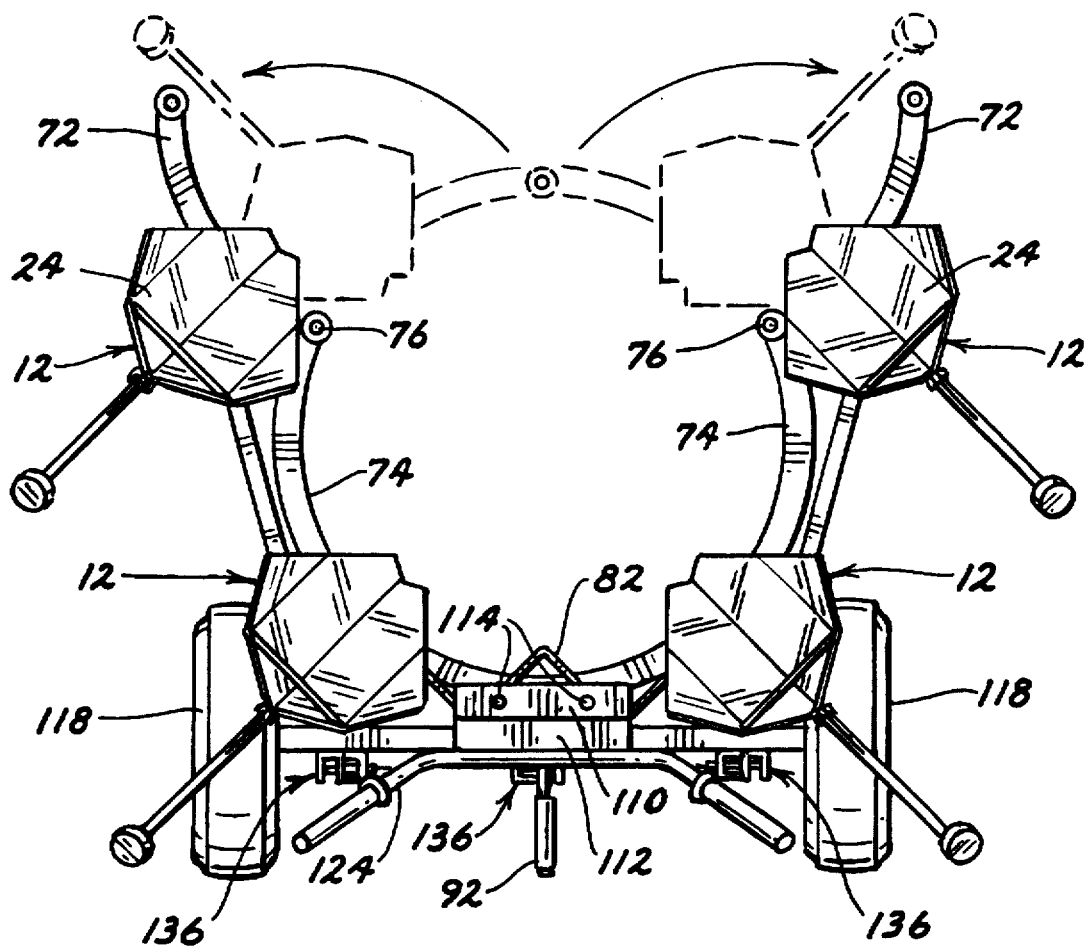
FIG. 3 is a top view of the preferred embodiment with the spades fully retracted and the spade support ring open for positioning around a plant.

As shown in FIGS. 2 and 3, ring assembly 14 includes two gate members 72 and a strength member 74. Together, the two gate members 72 and strength member 74 form a circle or ring to which the four spade assemblies 12 are mounted. One spade assembly 12 is mounted to each gate member 72 and two spade assemblies 12 are mounted to strength member 74. Each spade assembly 12 is spaced ninety degrees from the next when gate members 72 are joined, as indicated in FIG. 2. Gate members 72 are identical, each being symmetrically configured, as may be seen in the profile view in FIG. 4. Gate members 72 are pivotally attached to strength member 74, as by bolts 76. When ring assembly 14 is closed, as illustrated in FIG. 2, gate members 72 are joined as by a removable pin member 78, which may be easily removed or inserted by the operator prior to opening or closing ring assembly 14, respectively.

Figure 7:
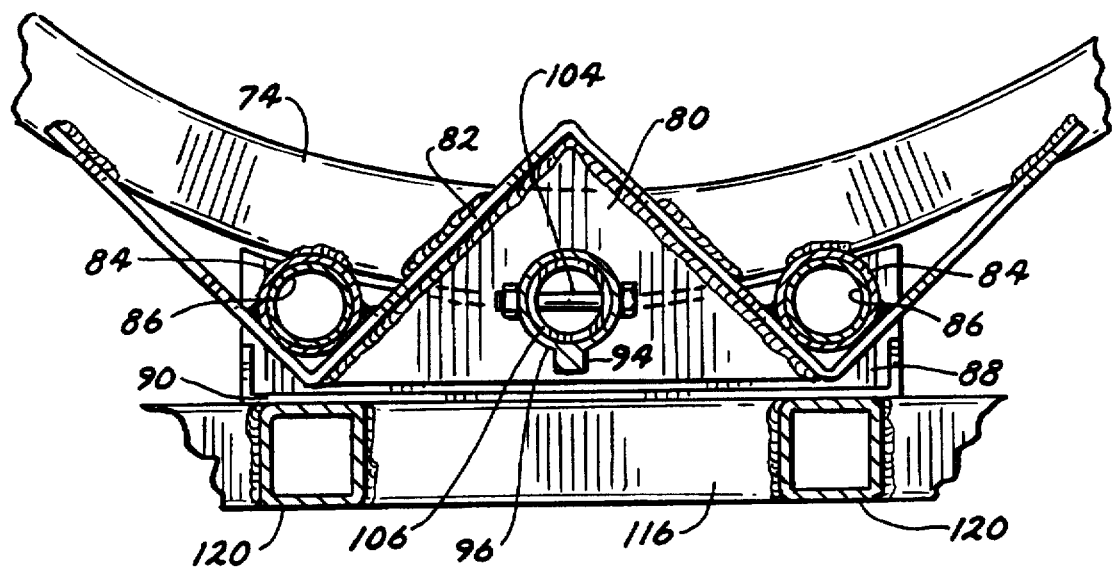
FIG. 7 is a sectional view of the support structure of the preferred embodiment taken along line 7—7 of FIG. 5.
Figure 8:
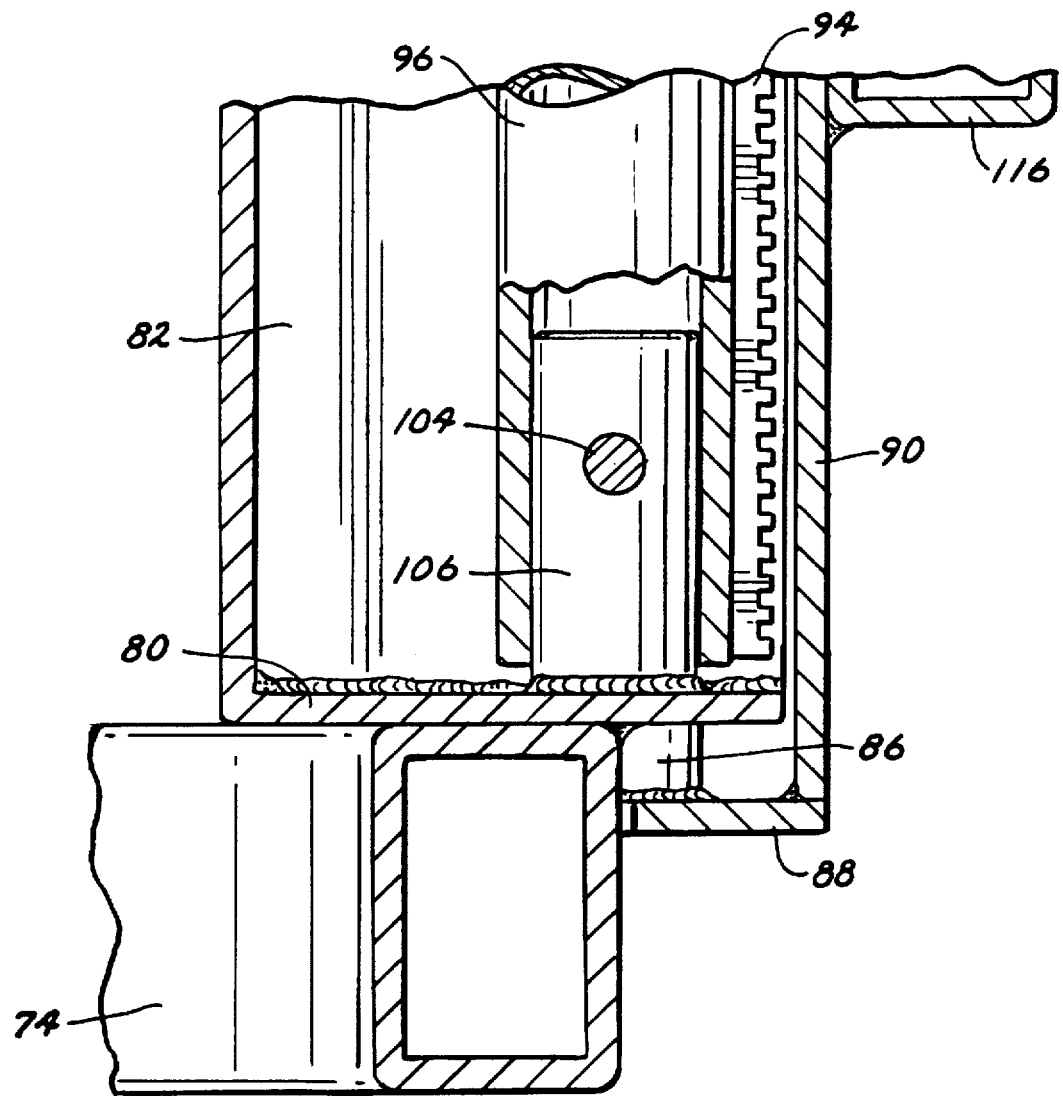
FIG. 8 is a sectional view of the support structure of the preferred embodiment taken along line 8—8 of FIG. 5.

As best illustrated in FIGS. 7 and 8, strength member 74 of ring assembly 14 is welded to triangular mounting plate 80, which in turn is welded to the central inverted V portion of W bracket 82. The outer ends of W bracket 82 are also welded to strength member 74. Cylindrical support post guide members 84 are also welded to the outer edge of strength member 74 and to W bracket 82. As shall be seen, support post guide members 84 glide vertically along support posts 86 of support structure 16 as ring assembly 14 is raised and lowered. As seen in FIG. 8, the lower ends of support posts 86 are welded to base plate 88 of support structure 16. Base plate 88 is welded to rear plate 90.

To raise and lower ring assembly 14, the user turns hand crank 92. Hand crank 92 and rack 94 are part of a commercially available crank driven rack and pinion assembly for raising and lowering ring assembly 14. Hand crank 92 engages a worm gear that in turn engages a larger gear that engages the teeth of rack 94. Rack 94 may be cut to any length, and in the present invention extends along the length of and is welded to lift post 96. Hand crank housing 98 is mounted to support member 100 with bolts 102 or the like. Lift post 96 is fixedly attached as by a bolt 104 to stud 106, which in turn is welded to mounting plate 80.

Figure 5:
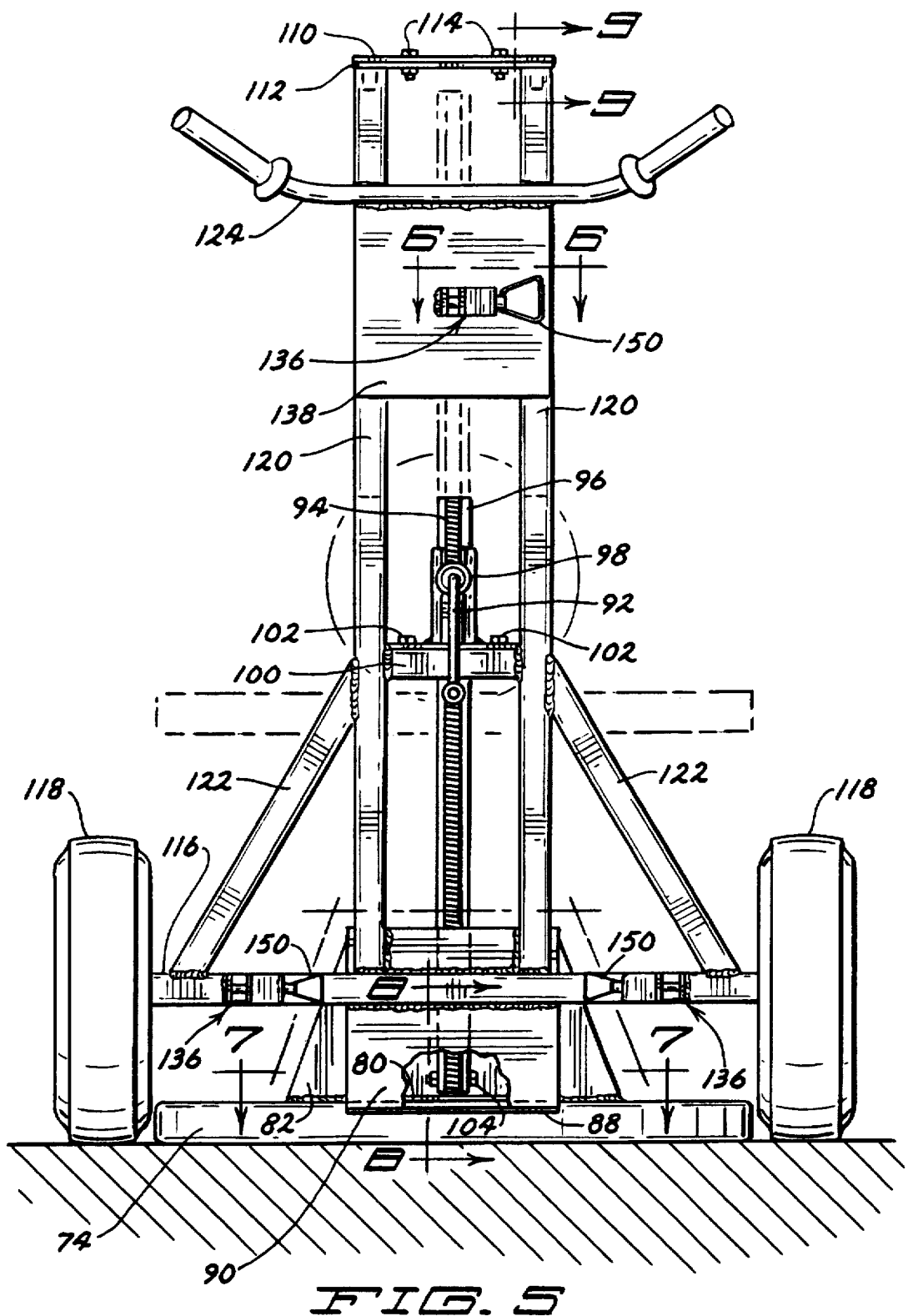
FIG. 5 is a partial sectional rear view of the support structure of the preferred embodiment.
Figure 9:
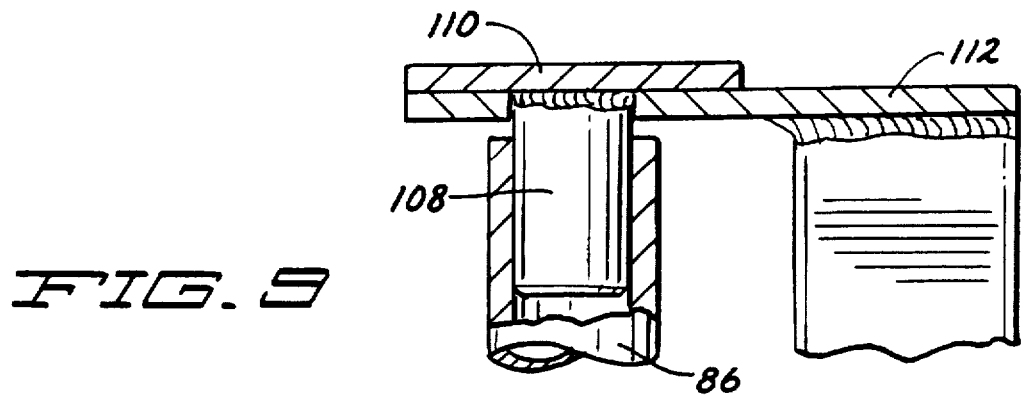
FIG. 9 is a sectional view of the support structure of the preferred embodiment taken along line 9—9 of FIG. 5.

As ring assembly 14 rises, support post guide members 84 travel over support posts 86, which engage studs 108 that are welded to upper mounting plate 110, as illustrated in FIG. 9. Upper mounting plate 110 is in turn fastened to upper frame plate 112 as by bolts 114. The remainder of support structure 16 includes lower cross brace 116, to which wheels 118 are fastened and rear plate 90 is welded. Extending upwardly from lower cross brace 116, to which they are welded, are two vertical braces 120, which project up to and engage upper frame plate 112. Support member 100, to which hand crank housing 98 is mounted, extends between vertical braces 120. Diagonal braces 122 engage and extend downwardly and away from vertical braces 120, and engage lower cross brace 116, as shown in FIG. 5.

Attached to an upper portion of support structure 16 is a handle bar 124, which is welded to vertical braces 120. Handle bar 124 permits easy manual maneuvering of excavating and transplanting apparatus 10. Attached to and projecting from lower cross brace 116 are two support beams 126, as illustrated in FIGS. 1, 2 and 4. Support beams 126 permit excavating and transplanting apparatus 10 to be rested in an upright position without placing any weight on the ring assembly 14.

Figure 6:
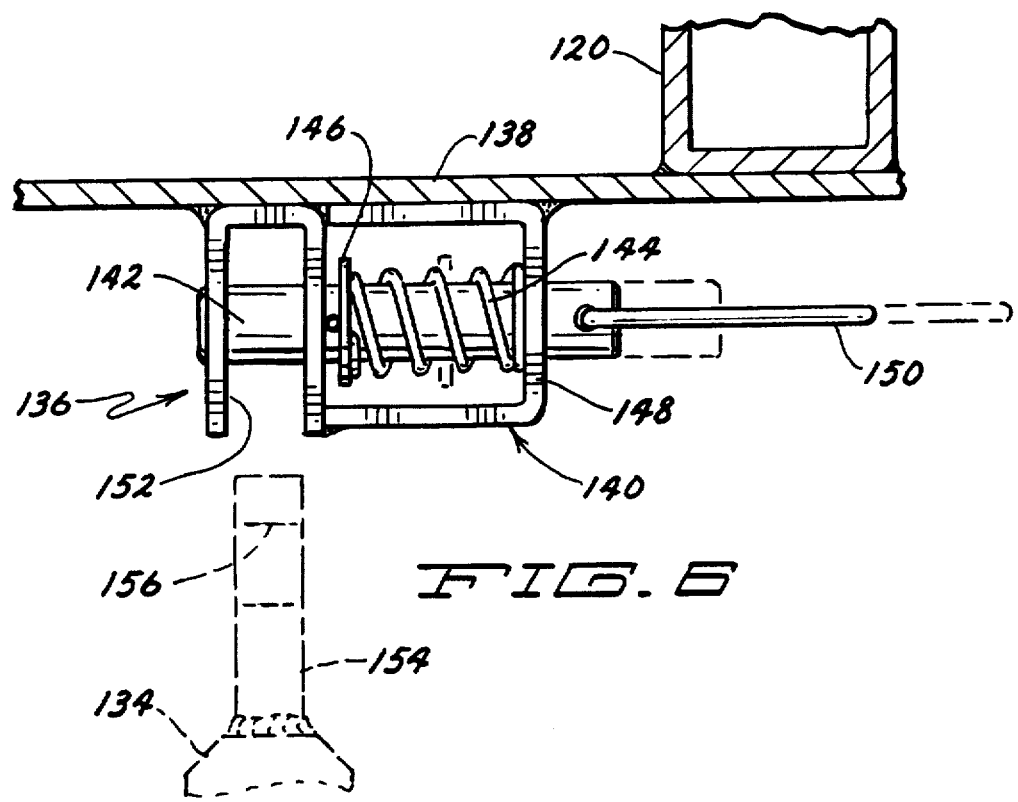
FIG. 6 is a sectional view of the support structure of the preferred embodiment taken along line 6—6 of FIG. 5.

As indicated in FIGS. 1 and 2, optional trailer assembly 22 includes a tongue member 128 having a hitch engaging assembly 130 at one end thereof. The other end of tongue 128 engages two support members 132 that attach to lower cross brace 116 of excavating and transplanting apparatus 10. Pivotally mounted to an intermediate position of tongue 128 is a transporting support member 134 that engages and supports the upper portion of support structure 16 when excavating and transplanting apparatus 10 is being towed by a vehicle. Transporting support member 134 releasably attaches to quick release assembly 136, which is mounted to trailering support plate 138, as illustrated in FIGS. 5 and 6. Quick release assembly 136 includes a housing 140 that contains a pin 142 that is maintained in position by spring 144. Spring 144 bears against pin mounted bearing plate 146 on one end and against first housing wall 148 on the other. When ring 150 is pulled by the user, the resistance of spring 144 is overcome and pin 142 is withdrawn from slot 152. Tab 154 of transporting support member 134 may be inserted into slot 152 and ring 150 is then released, permitting pin 142 to pass through opening 156 in tab 154. Two other quick release assemblies 136 are provided, both on lower cross brace 116, for attaching corresponding tab portions 154 of support members 132 of trailer assembly 22.

Figure 16:
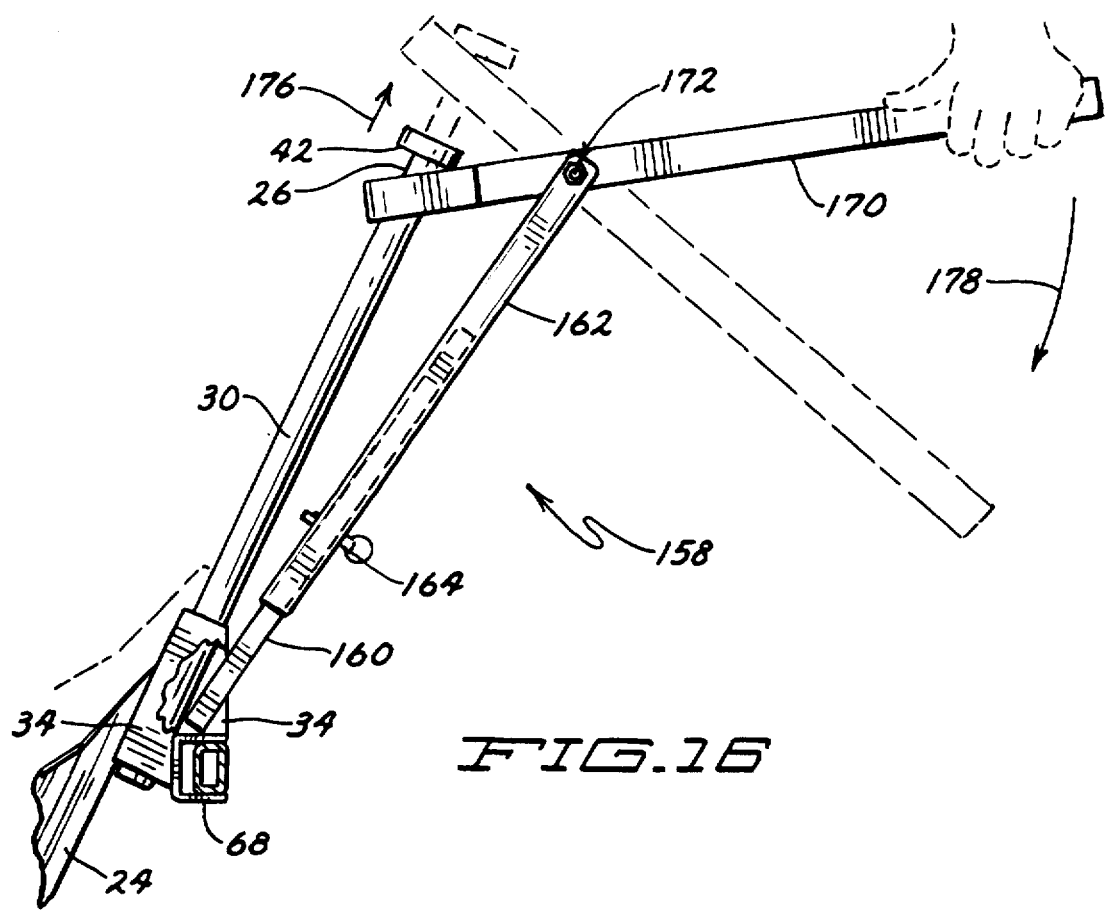
FIG. 16 is a side view of the spade pulling apparatus used with the tree planting and moving device of the present invention.
Figure 17:
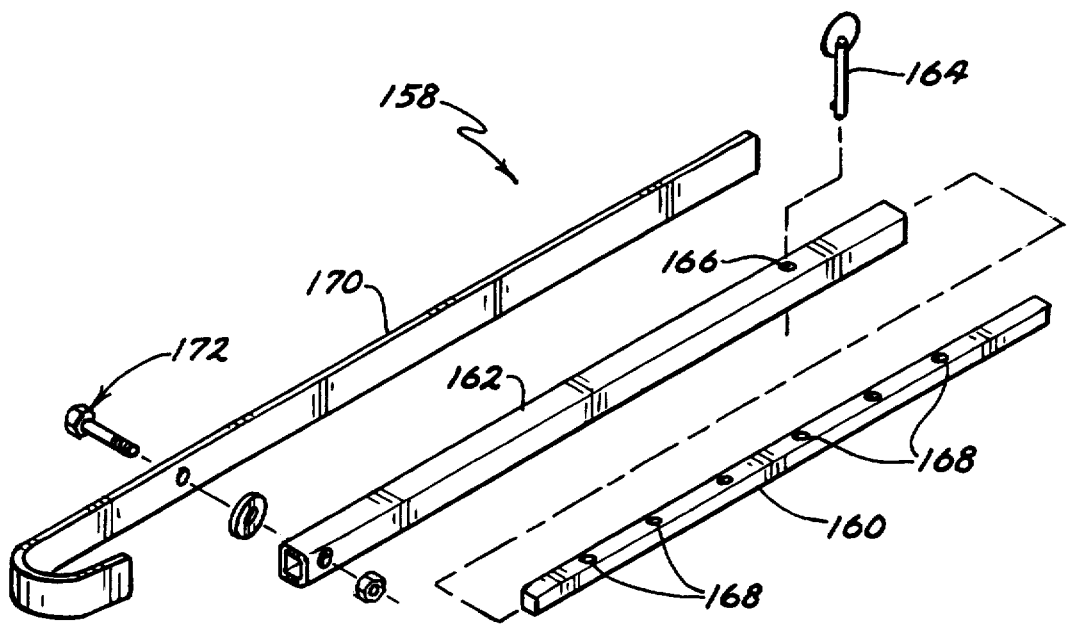
FIG. 17 is an assembly drawing of the spade pulling apparatus shown in FIG. 16.

FIGS. 16 and 17 illustrate extractor tool assembly 158, used for extracting spade 24 after a plant has been excavated from the soil or placed in a hole by the excavating and transplanting apparatus 10. As shown in FIG. 17, extractor tool assembly 158 includes perforated bar 160 that slides inside of hollow rod extender 162. Perforated bar 160 may be fixed at a particular position by inserting lock pin 164 through hole 166 of rod extender 162 and a selected hole 168 or perforated bar 160. Rod extender 162 is pivotally connected to lever arm 170 by bolt and washer assembly 172. Referring to FIG. 16, extractor tool assembly 158 is positioned with the end of perforated bar 160 positioned between gussets 34, resting on the upper surface of mounting bracket 68. The hook portion 174 of lever arm 170 is positioned below knob 42 of spade arm 26, and is used to draw the spade 24 in the direction of arrow 176 by pushing down on lever arm 170 in the direction of arrow 178. With each consecutive levering motion, lock pin 164 may be withdrawn and reinserted after extending the hole 166 of rod extender 162 to align with the next hole 168 of perforated bar 160.

In use, embodiment 10 of the excavating and transplanting apparatus may be pulled as a trailer behind a passenger vehicle or a utility vehicle such as a garden tractor using trailer assembly 22. While being towed, ring assembly 14 should be raised as shown in FIG. 1, with spades downwardly extended. Once the apparatus 10 has been brought to the location where it will be used, it may be disconnected from trailer assembly 22 by loosening pin 142 of the three quick release assemblies 136. Apparatus 10 may now be easily positioned for removal of a plant by grasping handle bar 124 and wheeling the device to the plant to be removed. Lift spades 24 to the extended position shown in FIGS. 3 and 10 using spade handle 66, with spades 24 fully retracted and retaining ring 38 turned to prevent downward movement of spade arm 26 into spade guide 30. Then lower ring assembly 14 by turning hand crank 92 until ring assembly 14 is near the ground. To properly position the apparatus, first remove pin member 78 that maintains gate members 72 in the closed position, and swing open gate member 72 to the position illustrated in FIG. 3. With gate members 72 opened, move the apparatus forward until the plant is centered within the area defined by ring assembly 14, as shown in FIG. 4. Gate members 72 must now be closed, and pin member 78 must be reinserted to properly maintain them in position. Ring assembly 14 should now be lowered until it is resting on the ground or fully lowered. Retaining rings 38 may now be turned to the position shown in FIG. 12, permitting spades 24 to move to the earth surrounding the plant. Spades 24 may now be driven into the ground using hammer 44. Each spade 24 should be driven into the ground until knob 42 on the end of spade arm 26 encounters retaining ring 38 at the top of spade guide 30.

After all four spades 24 have been fully driven into the ground, hand crank 92 may be turned to raise ring assembly 14. Support beams 126 must be firmly engaging the ground for the lifting operation to be successful. Once the plant clears the ground, a burlap sack or other container may be used to form a ball around the roots of the plant, or the plant may be carried using apparatus 10 to another location for transplanting, in which case the steps listed above are reversed. In either case, extractor tool assembly 158 is used as discussed above to remove spades 24 from around the root ball formed by apparatus 10.

Figure 18:
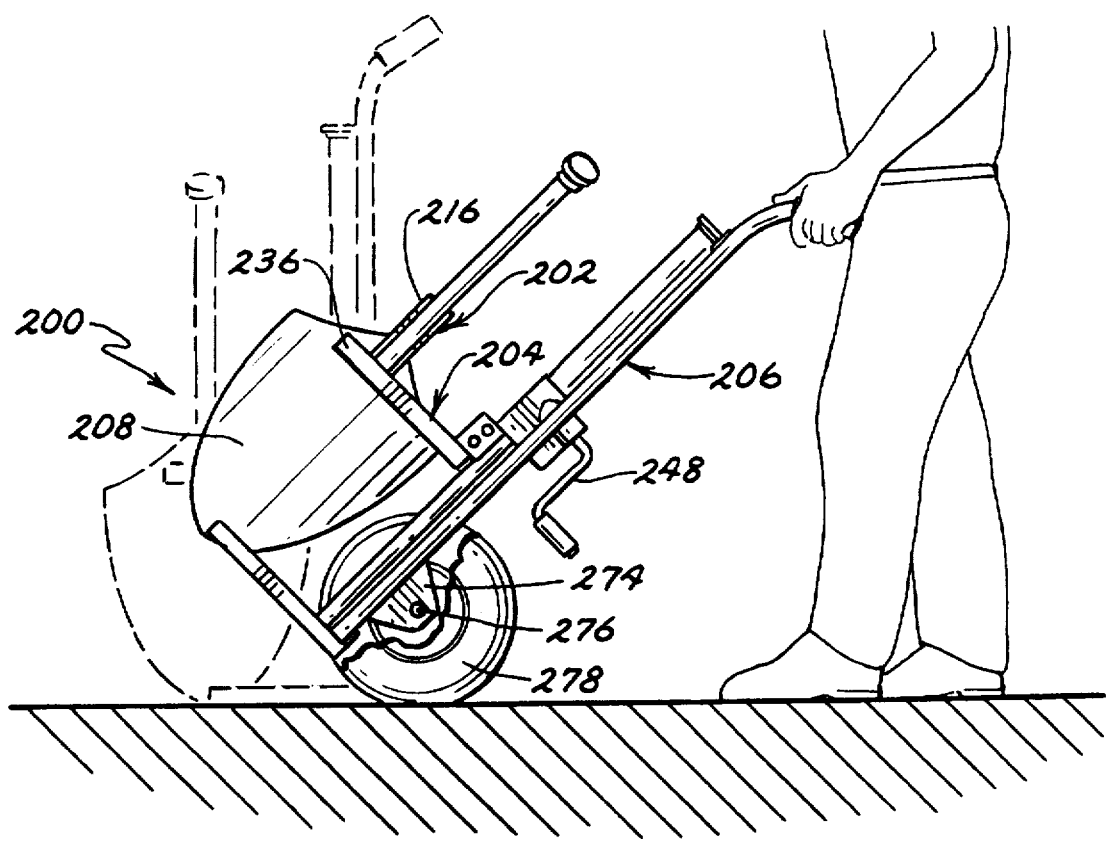
FIG. 18 is a side view of a second embodiment of the subject tree moving device showing the device in a transporting position.

With reference to FIG. 18, an alternate embodiment of the apparatus for excavating and transplanting trees and the like is generally indicated by reference numeral 200. Excavating and transplanting apparatus 200 includes two spade assemblies 202, each of which is mounted to frame assembly 204. Frame assembly 204 is mounted to support structure 206.

Figure 27:
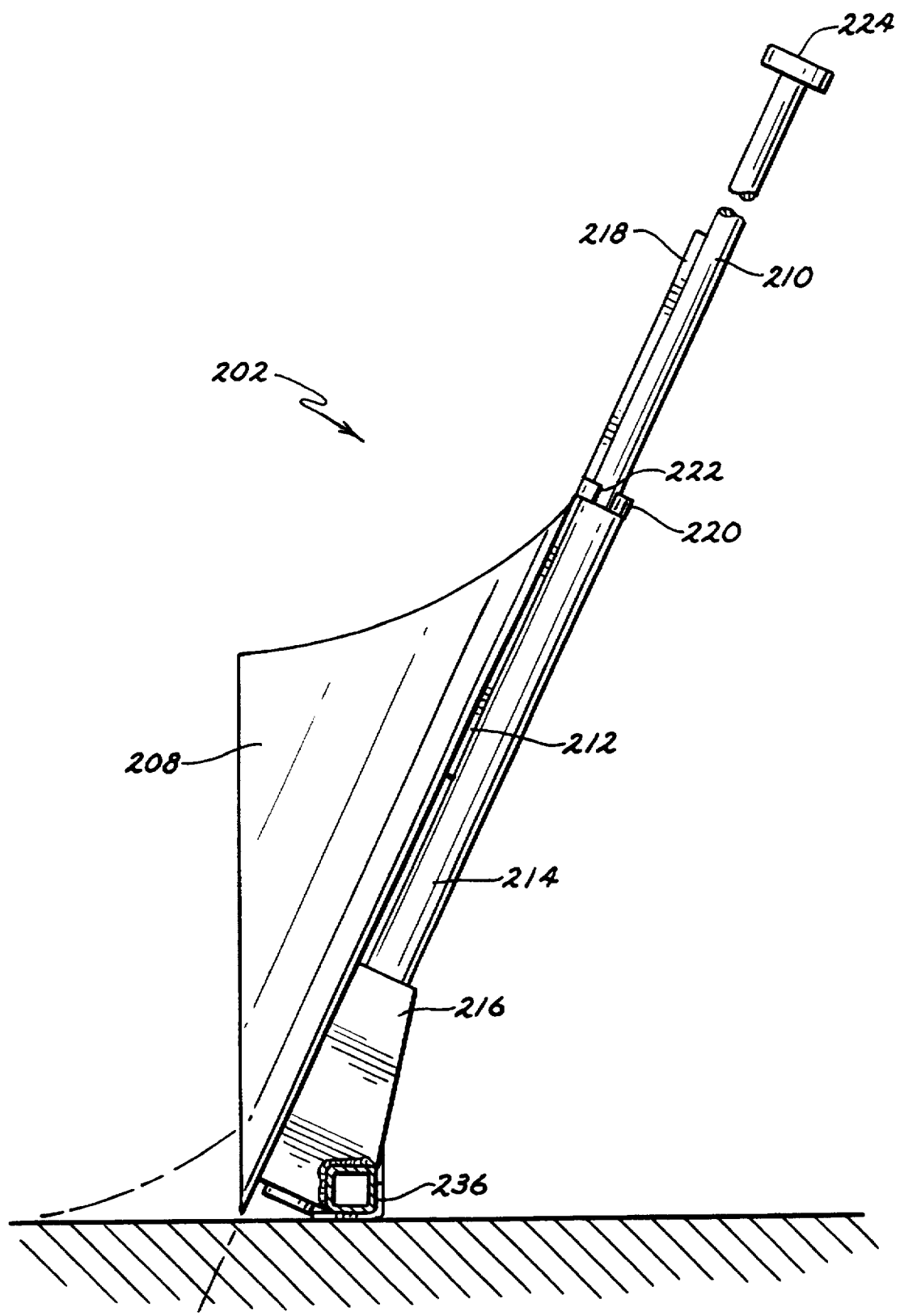
FIG. 27 is a side view of a single spade assembly of the second embodiment showing the spade fully retracted.

As most clearly shown in FIG. 27, each spade assembly 202 includes a spade 208 fixedly mounted to a cylindrical spade arm 210 along spade connector 212, which is welded to both the spade 208 and spade arm 210. Spade arm 210 in turn passes within a hollow, cylindrical spade guide 214, with spade connector 212 passing through a longitudinal slot in spade guide 214 similar to slot 32 in spade guide 30 of excavator 10. Spade 208 is supported at its upper end by spade connector 212 and at its lower end by a pair of gussets 216, along the edge of which spade 208 slides as it is being driven into and withdrawn from the ground around a plant. Gussets 216 are welded to spade guide 214.

Along the upper portion in of spade arm 210 is attached as by welding a rib member 218 projecting from the spade arm 210. Rib member 218 passes through the longitudinal slot in spade guide 214 as spade 208 is driven into the ground. However, when spade 208 is in its fully retracted position, as indicated in FIG. 27, retaining ring 220 acts to secure spade 208 in that position by limiting the motion of the spade in the downward direction by blocking rib member 218. Retaining ring 220 includes a cutout 222 therein, and when spade 208 is ready to be driven into the ground, retaining ring 220 is rotated until cutout 222 lines up with rib member 218, allowing rib member 218 to pass therethrough.

Figure 22:
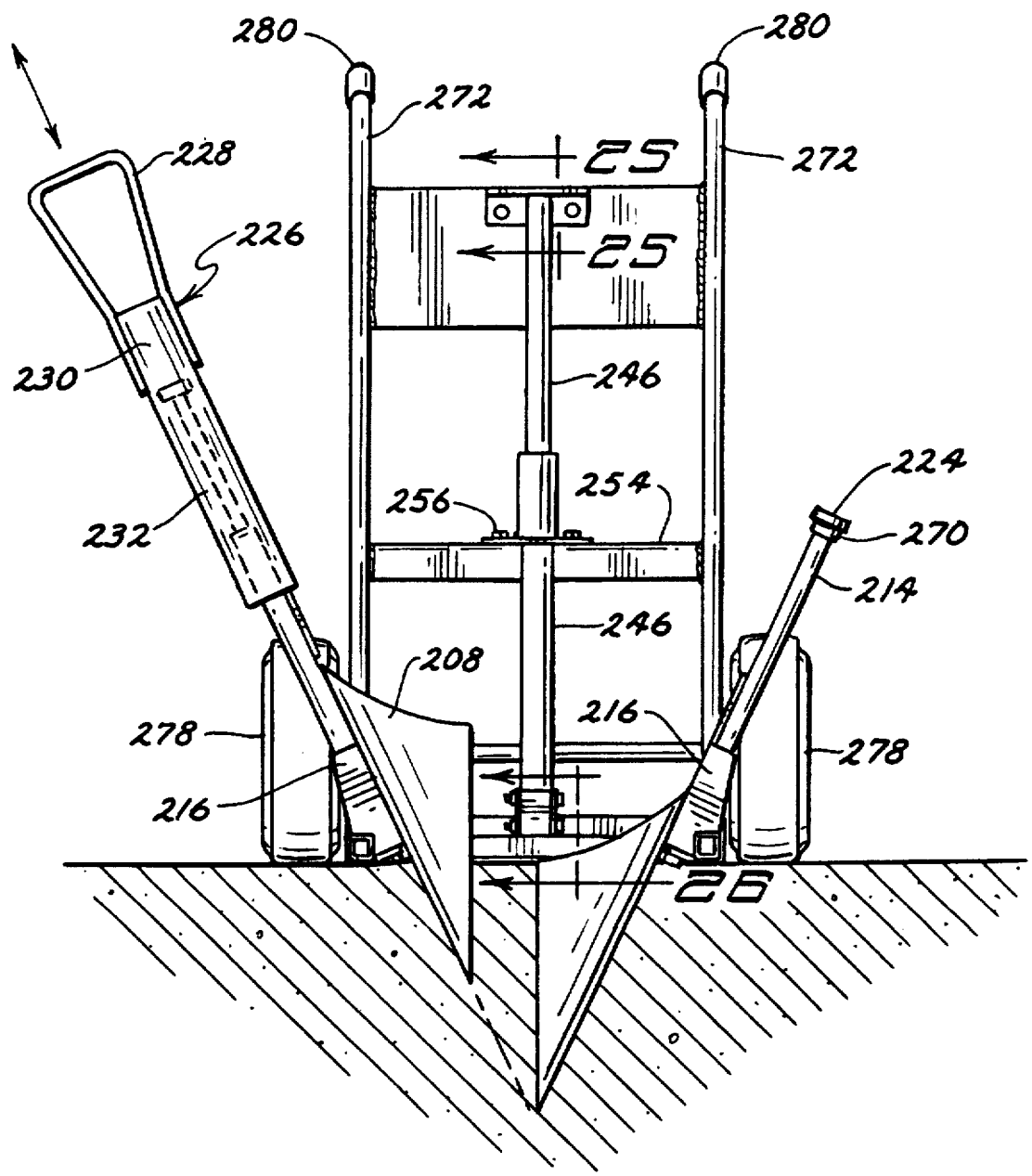
FIG. 22 is a front view of the second embodiment with one spade fully extended into a digging position and the other partially driven into the ground showing the position of the hammer for driving the spade into the ground.

At the very top end of spade arm 210 is a knob 224 slightly larger in diameter than spade arm 210. Knob 224 is intended to receive the blows from hammer 226 that drive spade 208 into the ground, as best illustrated in FIG. 22. Hammer 226 includes a long handle member 228 that may be gripped by both hands of the user. Preferably, hammer 226 includes a weighted portion 230 to give the hammer added momentum during its downward thrust. The inside diameter of the cylindrical hammer body 232 must be greater than the outside diameter of spade guide 214, as the spade 208 will typically be driven into the soil until knob 224 encounters retaining ring 220.

Figure 28:
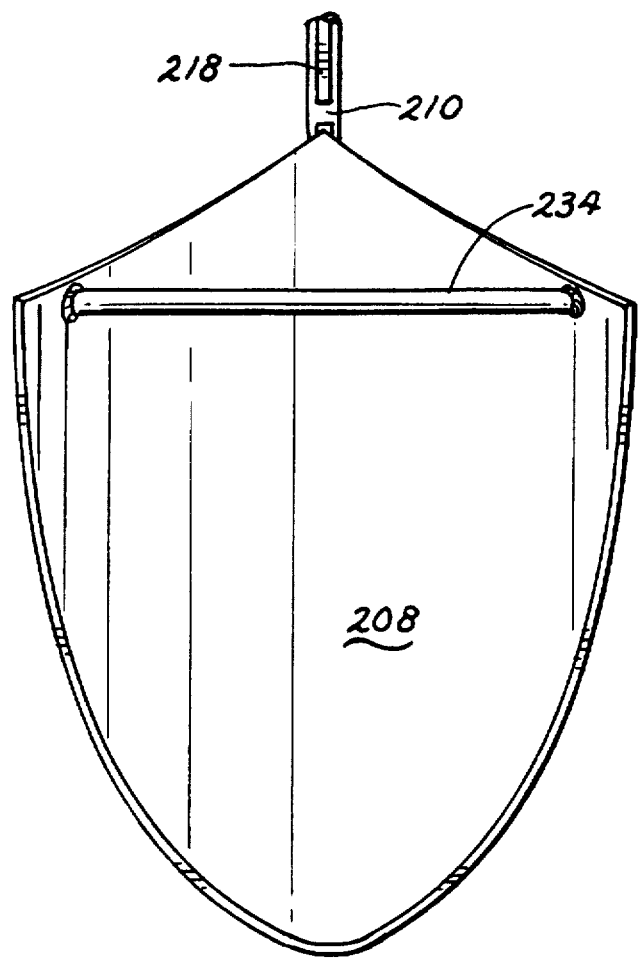
FIG. 28 is a front view of the spade of the second embodiment.
Figure 29:
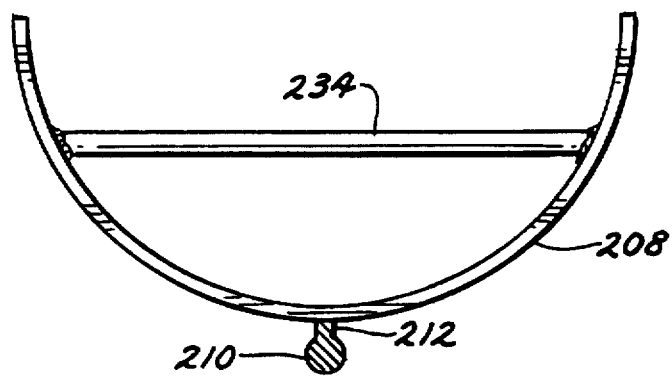
FIG. 29 is a top view of the spade of the second embodiment.

Referring to FIGS. 28 and 29, it may be seen that spade 208 preferably forms a continuous semicircle about its periphery. To aid in positioning spade 208, a handle 234 is provided, extending between opposite portions of spade 208.

Figure 19:
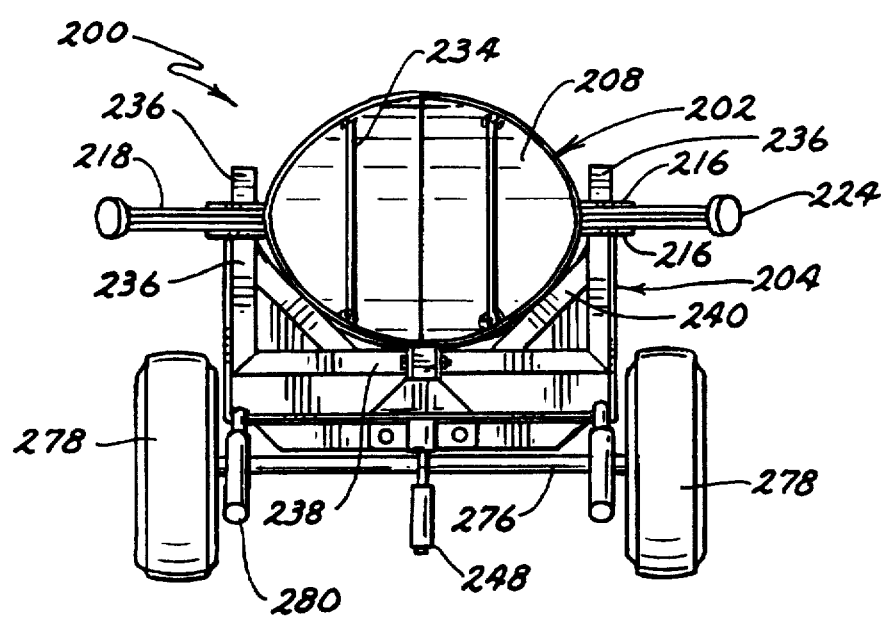
FIG. 19 is a top view of the embodiment shown in FIG. 18 with the spades in their downwardly extending position.
Figure 20:
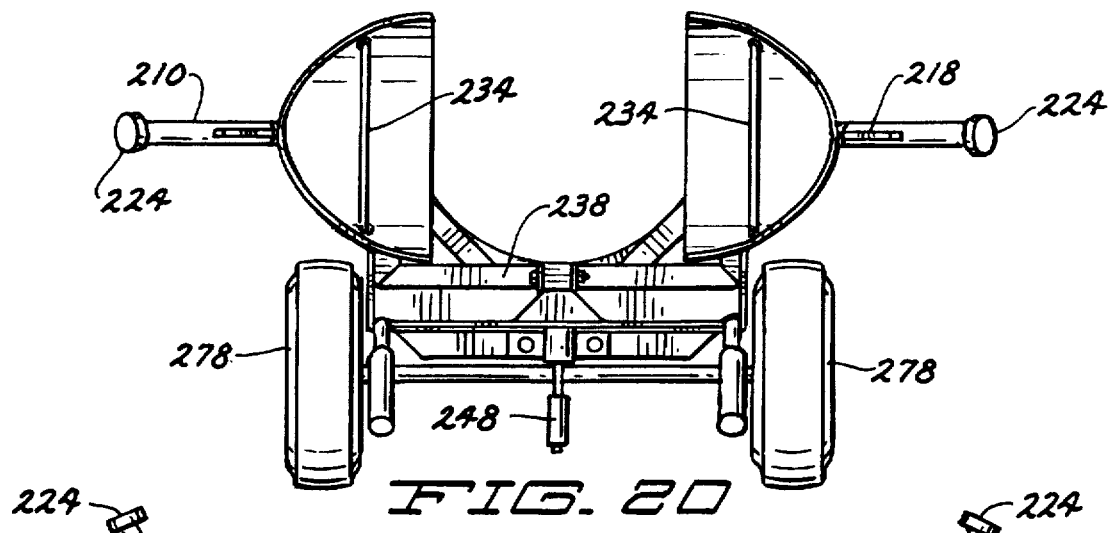
FIG. 20 is a top view of the second embodiment with both spades fully retracted and ready for positioning around a plant.
Figure 21:
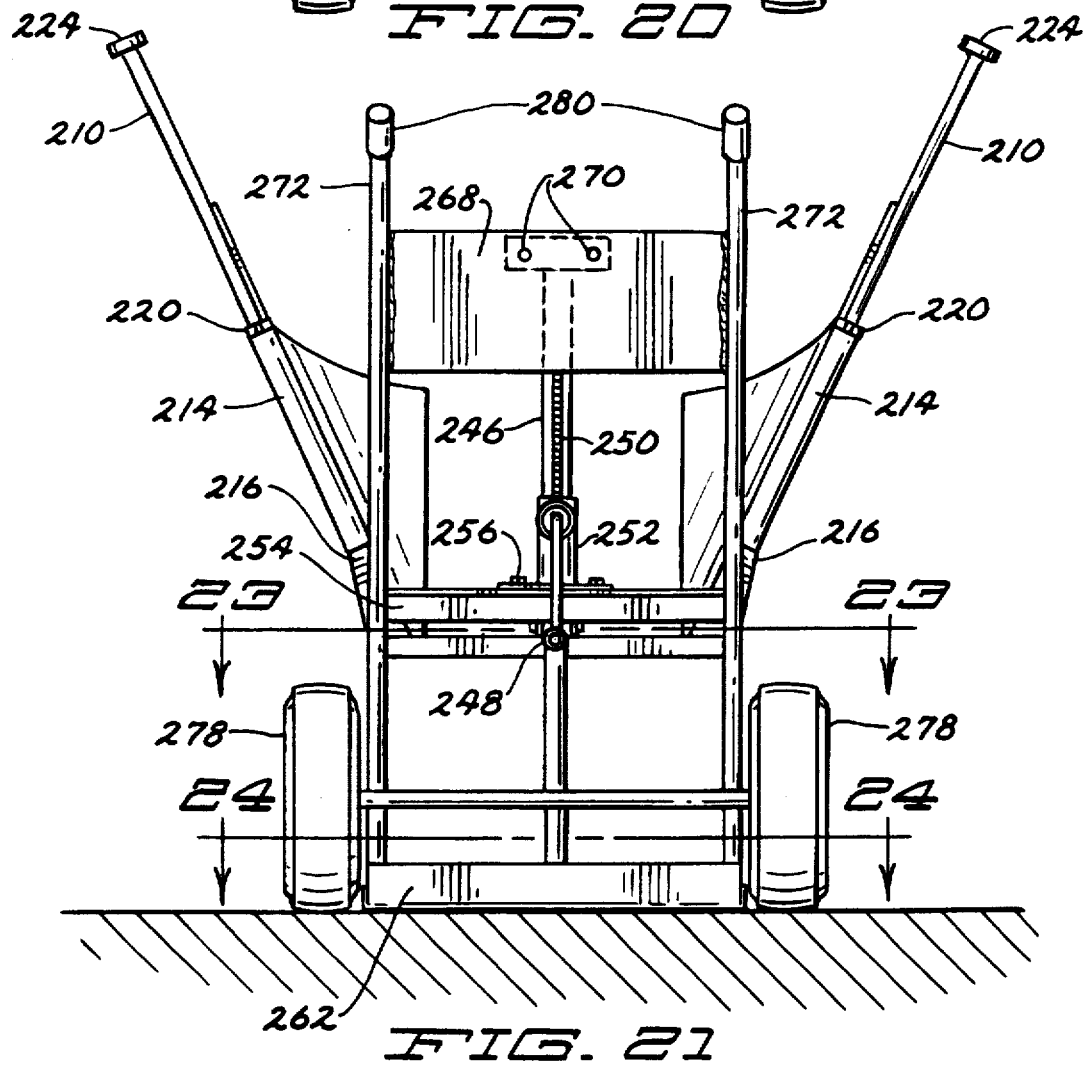
FIG. 21 is a rear view of the second embodiment with both spades fully retracted.
Figure 23:
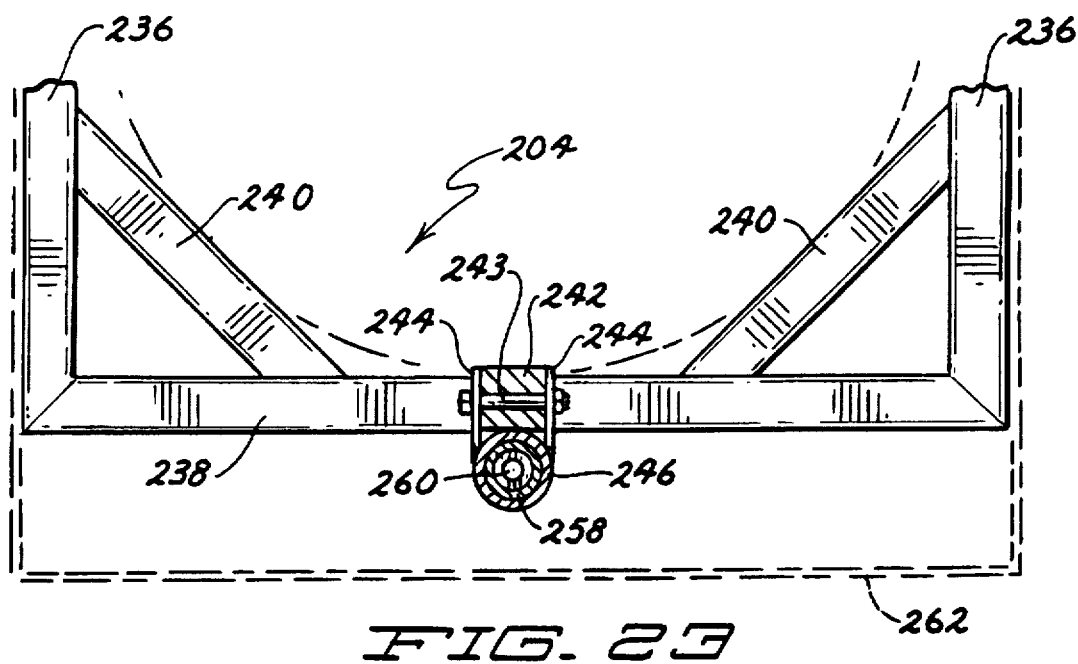
FIG. 23 is a sectional view of the second embodiment taken along line 23—23 of FIG. 21.
Figure 24:
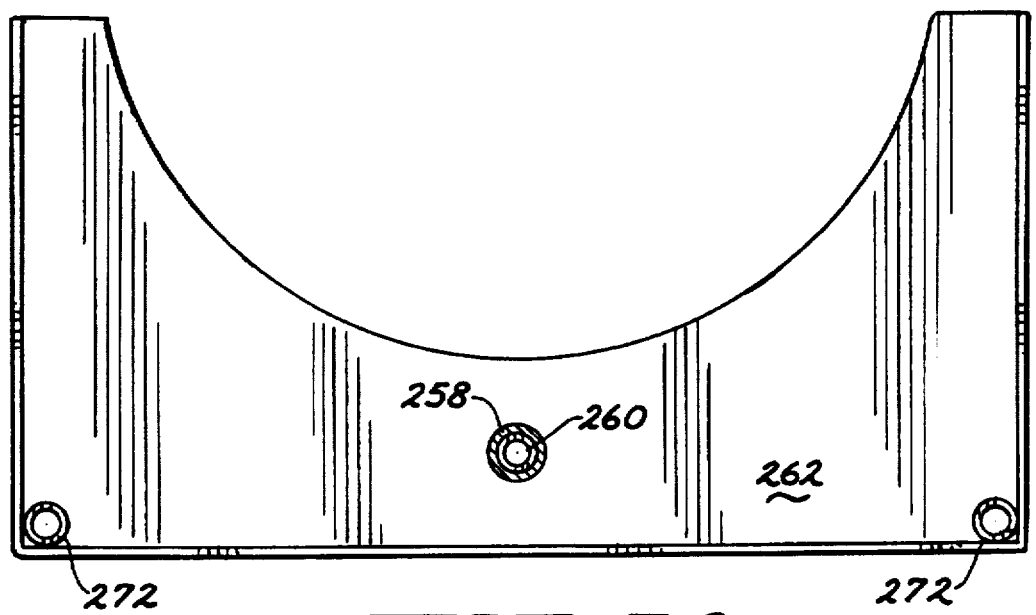
FIG. 24 is a sectional view of the second embodiment taken along line 24—24 of FIG. 21.
Figure 25:
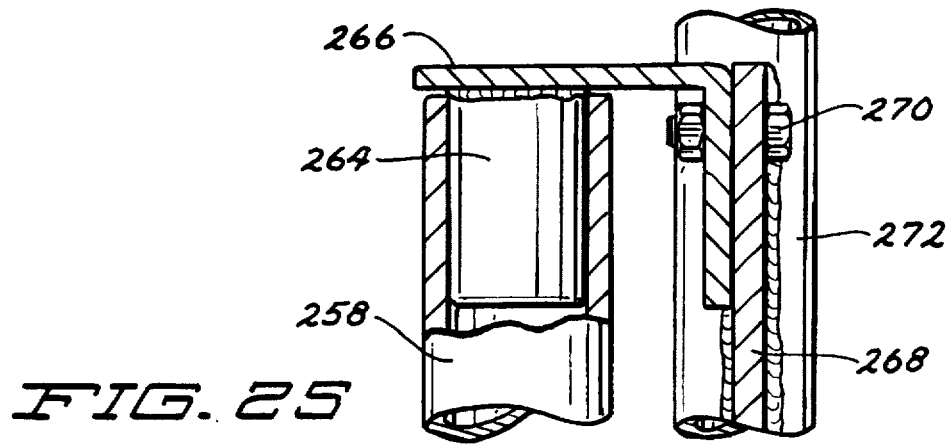
FIG. 25 is a partial sectional view of the second embodiment taken along line 25—25 of FIG. 22.

Both spade assemblies 202 are welded to frame assembly 204. Gussets 216 are welded to projecting arms 236 of frame assembly 204. Referring to FIGS. 19, 23 and 27, frame assembly 204 also includes a connecting element 238 extending between and welded to projecting arms 236. Also provided are diagonal braces 240 extending between intermediate points of connecting element 238 and each projecting arm 236.

Figure 26:
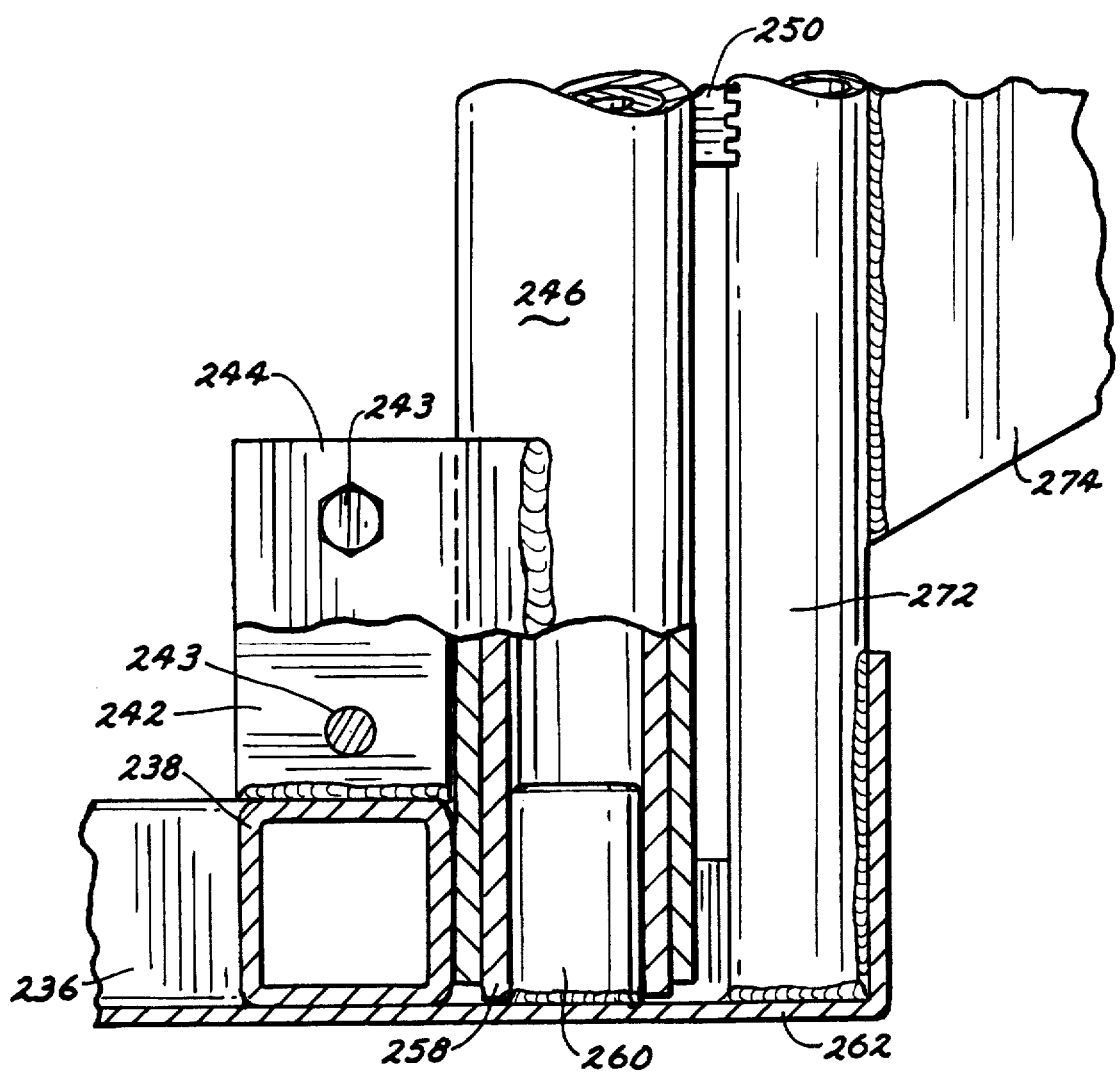
FIG. 26 is a partial sectional view of the second embodiment taken along line 26—26 of FIG. 22.

Referring to FIGS. 23 and 26, connecting element 238 is welded to lifting block 242, which is fastened by bolts 243 to two parallel attachment plates 244 welded to lift post 246. To raise and lower frame assembly 204, the user turns hand crank 248. Hand crank 248 and rack 250 are part of a commercially available crank driven rack and pinion assembly for raising and lowering frame assembly 204. Rack 250 extends along the length of and is welded to lift post 246. Hand crank housing 252 is mounted to support member 254 with bolts 256 or the like. Lift post 246 glides vertically along lift support post 258, which engages first stud 260 welded to base plate 262 on one end and second stud 264 welded to upper mounting plate 266 on the other end. Upper mounting plate 266 is attached to support plate 268 as by bolts 270.

In addition to support plate 268 and support member 254, support structure 206 also includes upright support members 272, to which support plate 268 and support member 254 are welded. Also welded to upright support members are wheel support gussets 274, to which are mounted axle shaft 276, at either end of which are positioned wheels 278. The upper ends of upright support members 272 are equipped with handle grips 280, and the lower ends are welded to base plate 262.

With reference to FIG. 30, another alternate embodiment of the apparatus for excavating and transplanting trees and the like is generally indicated by reference numeral 300. Plant excavator 300 shares many characteristics and features with preferred apparatus 10, but it includes six spades instead of four, and it is permanently mounted to a trailer. Because it is heavier and slightly more difficult to manipulate than the four spade version, especially when it is carrying a tree and root ball, although still lighter than prior art devices, embodiment 300 includes four hydraulic cylinders to aid in positioning the apparatus around the tree or planting site. Excavating and transplanting apparatus 300 includes six spade assemblies 302, each of which is mounted to ring assembly 304. Ring assembly 304 is mounted to support structure 306, which is mounted in turn to trailer assembly 308.

Figure 32:
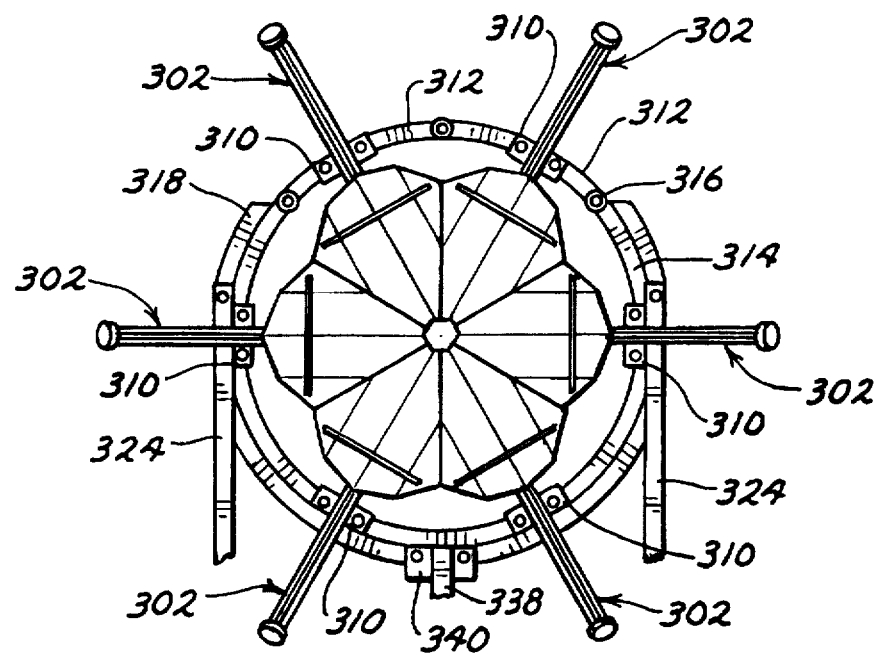
FIG. 32 is a top view, of the ring assembly of the embodiment shown in FIG. 31 with the spades in their downwardly extending position.
Figure 33:
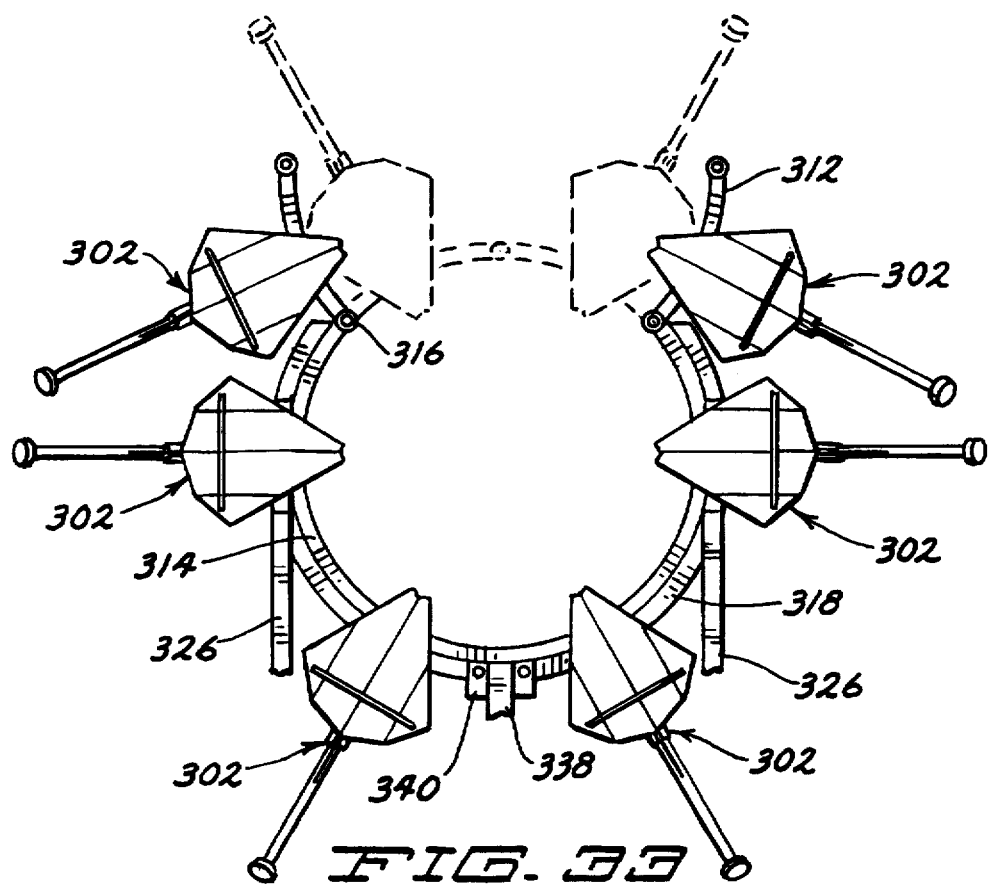
FIG. 33 is a top view of the ring assembly of the third embodiment with the spades fully retracted and the spade support ring open for positioning around a plant.

As most clearly shown in FIGS. 32 and 33, the configuration and arrangement of spade assemblies 302 are identical to those of spade assemblies 12 preferred embodiment 10. Each spade assembly 302 is mounted to ring assembly 304 with a removable mounting bracket 310. Ring assembly 304 includes two gate members 312 and a strength member 314. Together, the two gate members 312 and strength member 314 form a circle or ring to which the six spade assemblies 302 are mounted. One spade assembly 302 is mounted to each gate member 312 and four spade assemblies 302 are mounted to strength member 314. Each spade assembly 302 is spaced sixty degrees from the next when gate members 312 are joined as indicated in FIG. 32. Gate members 312 are identical, each being symmetrically configured. Gate members 312 are pivotally attached to strength member 314, as by bolts 316. Operation and configuration of ring assembly 304 is otherwise identical to that of ring assembly 14 of embodiment 10.

Figure 34:
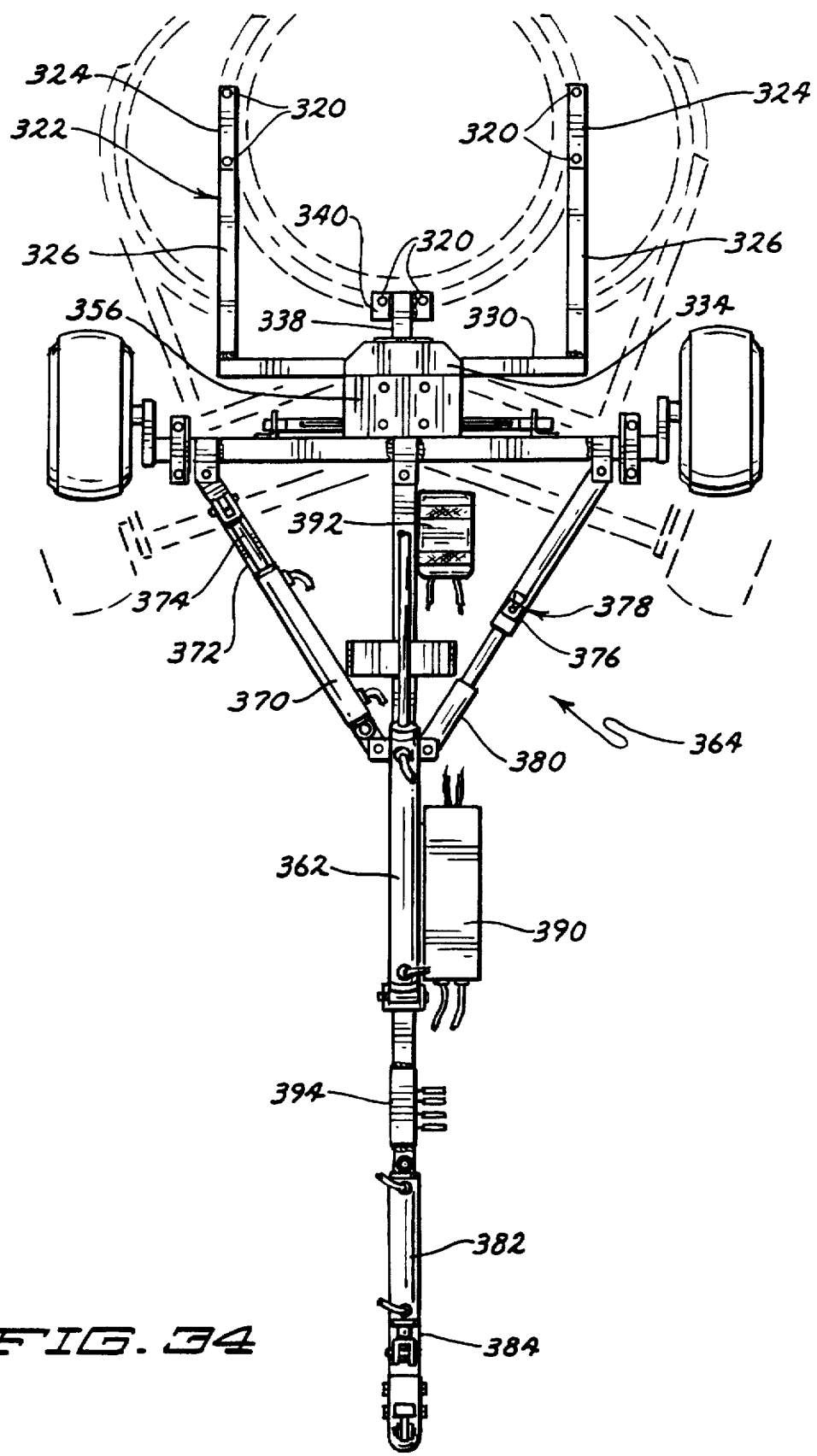
FIG. 34 is a top view of the trailer and support assemblies of the third embodiment showing the range of available positions in phantom.
Figure 35:
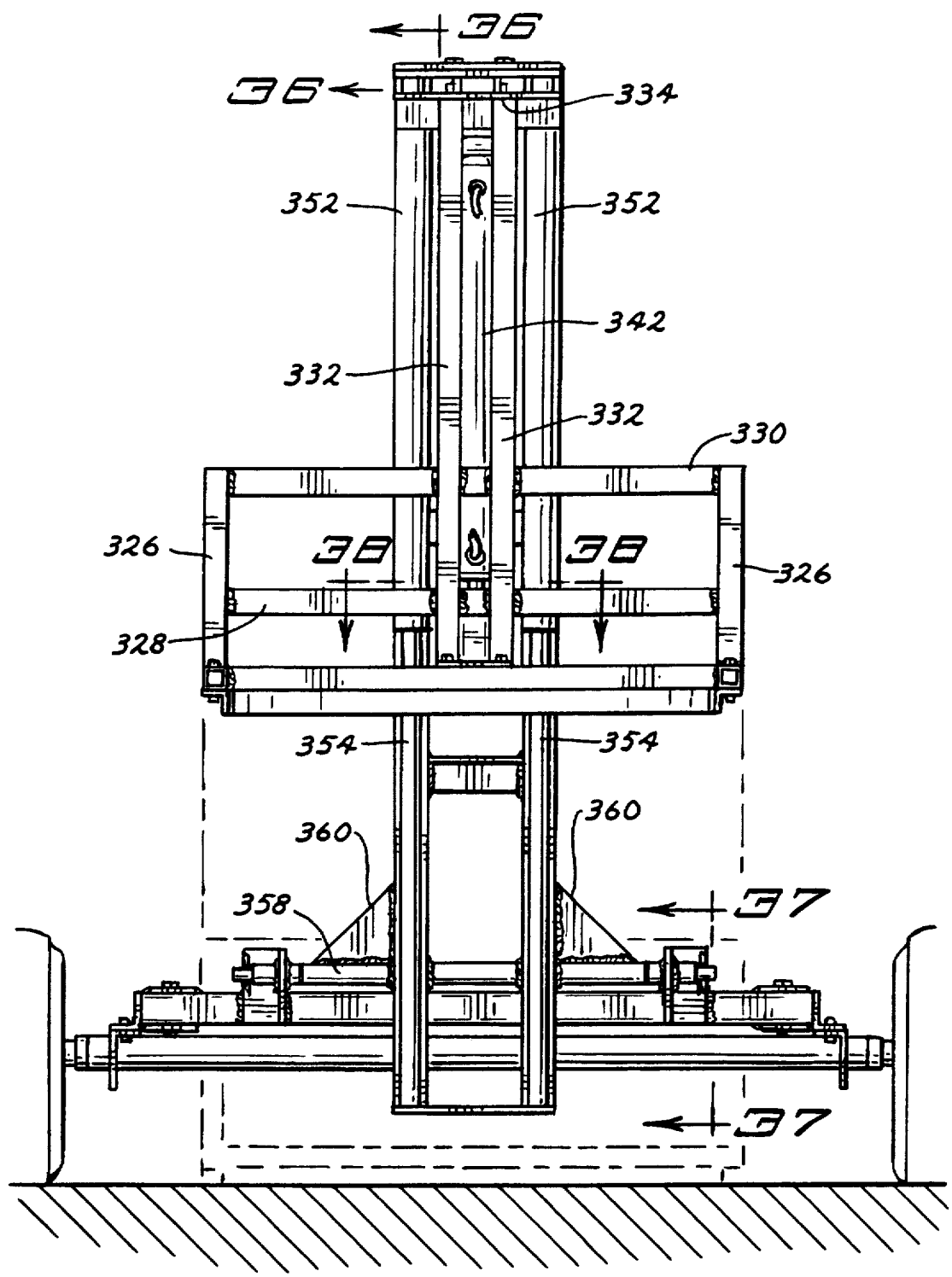
FIG. 35 is a front view of the third embodiment with the ring assembly removed.
Figure 38:
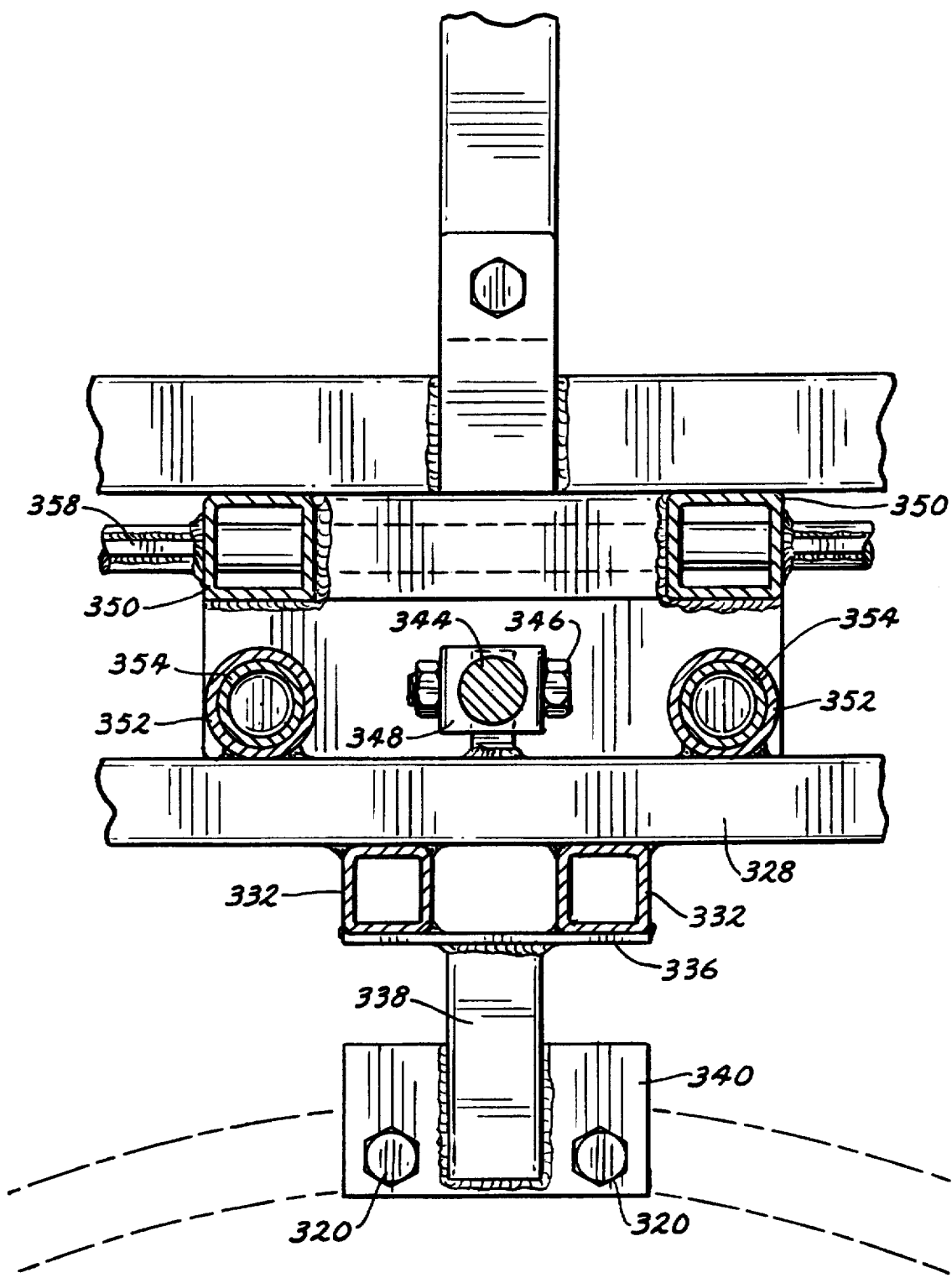
FIG. 38 is a sectional view of the third embodiment taken along line 38—38 of FIG. 35.

Referring to FIGS. 32–34, fastened to the periphery of strength member 314 of ring assembly 304 as by welding is a flange 318 made of angle iron. As best shown in FIG. 34, flange 318 fastens in three places as by bolts 320 to supporting frame 322. Referring to FIGS. 30, 34 and 35, supporting frame 322 includes two projecting arms 324, two diagonal supports 326, lower connecting element 328 and upper connecting element 330. Bolts 320 attach flange 318 to the area near the end of each of projecting arms 324, as shown in FIG. 34. As seen on FIG. 35, attached to both lower connecting element 328 and upper connecting element 330 on the supporting frame 322 as be welding are two support posts 332, each of which extends upwardly to and are attached to upper support plate 334. As seen in FIG. 38, welded to both support post guide members is a mounting plate 336 to which is welded a short diagonal support element 338, which is in turn welded to a mounting plate 340 that also attaches to flange 318 by bolts 320.

Unlike the other embodiments of the present invention, the ring assembly 304 of excavating and transplanting apparatus 300 and the accompanying support structure 306 is raised and lowered by a hydraulic cylinder 342. As shown in FIG. 38, the piston 344 of hydraulic cylinder 342 attaches as by a bolt 346 to mounting bracket 348, which is welded to lower connecting element 328. The other end of hydraulic cylinder 342 is anchored to two brackets 348 attached to upright mast frame members 350.

Figure 36:
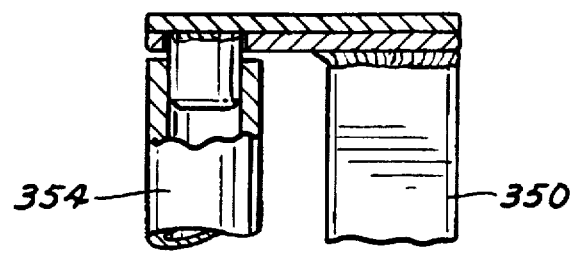
FIG. 36 is a partially cut away sectional view of the third embodiment taken along line 36—36 of FIG. 35.

As ring assembly 304 is raised and lowered, lift posts 352 travel along lift support posts 354. Lift posts 352 and support posts 332 terminate at and are affixed at their upper ends to upper support plate 334. As seen in FIGS. 30 and 36, lift support posts 354 terminate at and are affixed to upper mast plate 356, as do upright mast frame members 350.

Figure 37:
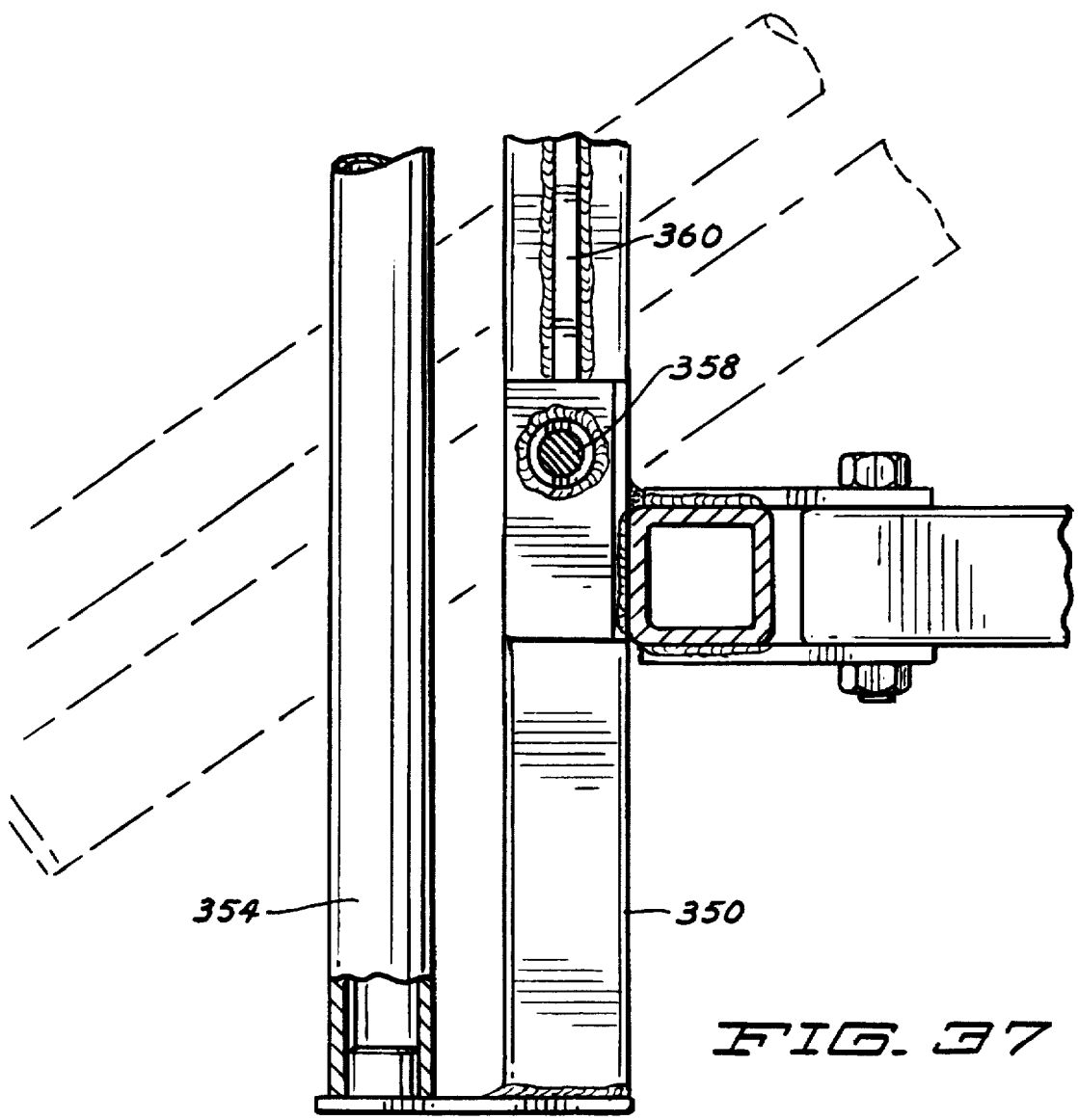
FIG. 37 is a partially cut away sectional view of the third embodiment taken along line 37—37 of FIG. 35.

As seen in FIGS. 35 and 37, upright mast frame members 350 also intersect pivot rod 358, the intersection with which is reinforced by gussets 360. As seen in FIGS. 30 and 34, a second hydraulic cylinder 362 projecting upwardly from trailer frame assembly 364 permits the tilting of mast assembly 366 fore and aft between the travel position and the upright position indicated in phantom in FIG. 30. When in the travel position, mast assembly 366 leans against rest assembly 368 projecting upwardly from trailer frame assembly 364.

As indicated in FIG. 34, a third hydraulic cylinder 370 is provided on first extendable trailer element 372 to permit of adjustment of lateral positioning of ring assembly 304 between the extreme positions indicated in phantom. Expansion and contraction of the piston 374 permits the indicated pivoting motion only when spring loaded release pin 376 of quick release assembly 378 is withdrawn from a lock hole (not shown) in second extendable trailer element 380.

As indicated in FIGS. 30 and 31, a fourth hydraulic cylinder 382 is mounted to extendable tongue element 384 of trailer frame assembly 364. Extension of piston 386 from hydraulic cylinder 382 causes extension of trailer frame assembly 364, and thereby the entire excavating and transplanting apparatus 300, in the direction indicated by direction arrow 388 in FIG. 31.

Hydraulic fluid is circulated by pump 390 which is powered by battery 392 and controlled by lever controls 394, all of which are mounted to trailer frame assembly 364.

Figure 39:
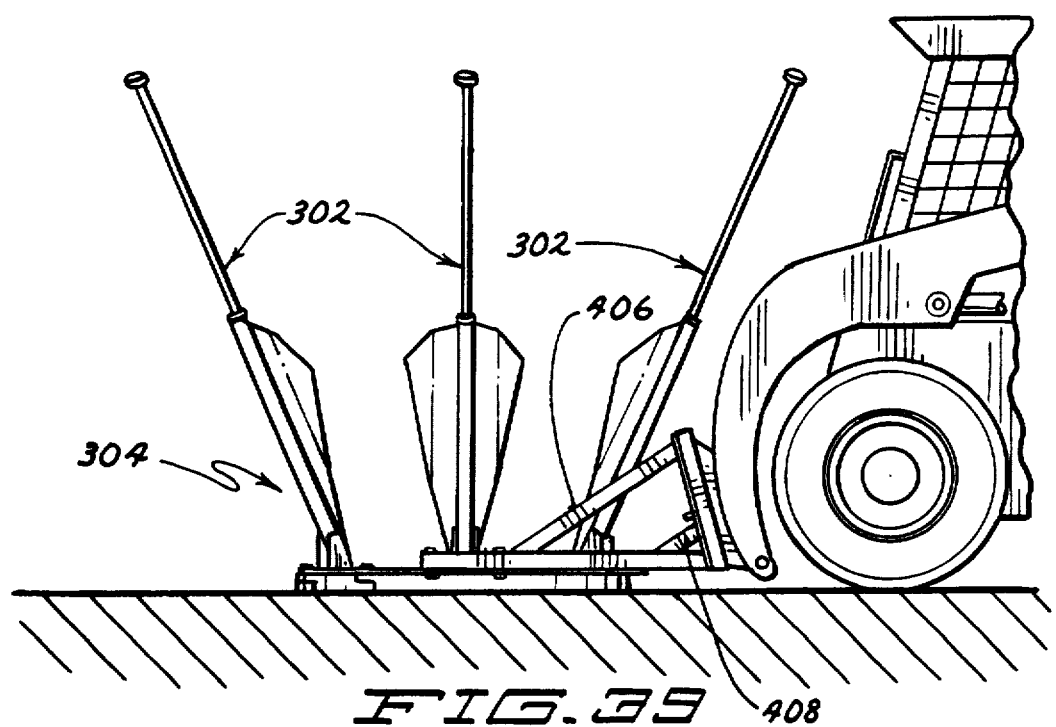
FIG. 39 is a side view of a fourth embodiment of the subject tree moving device showing the device attached to a skid loader.
Figure 40:
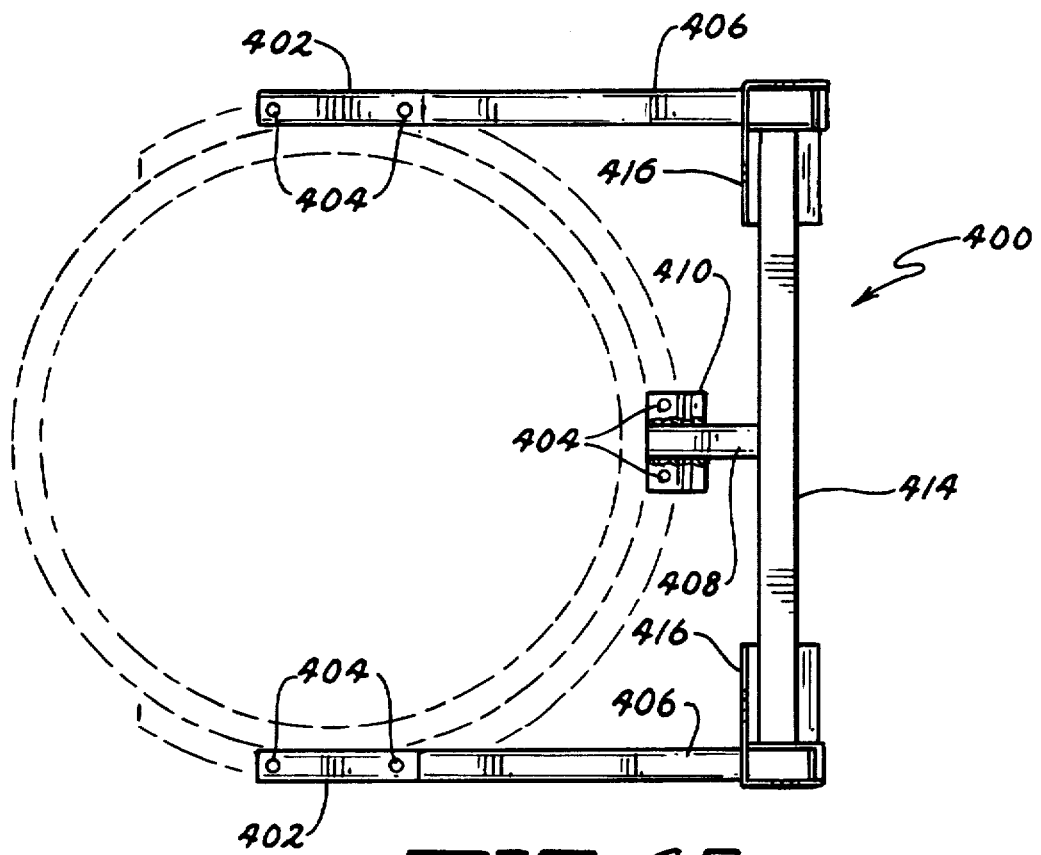
FIG. 40 is a top view of the support assembly of the embodiment shown in FIG. 39.
Figure 41:
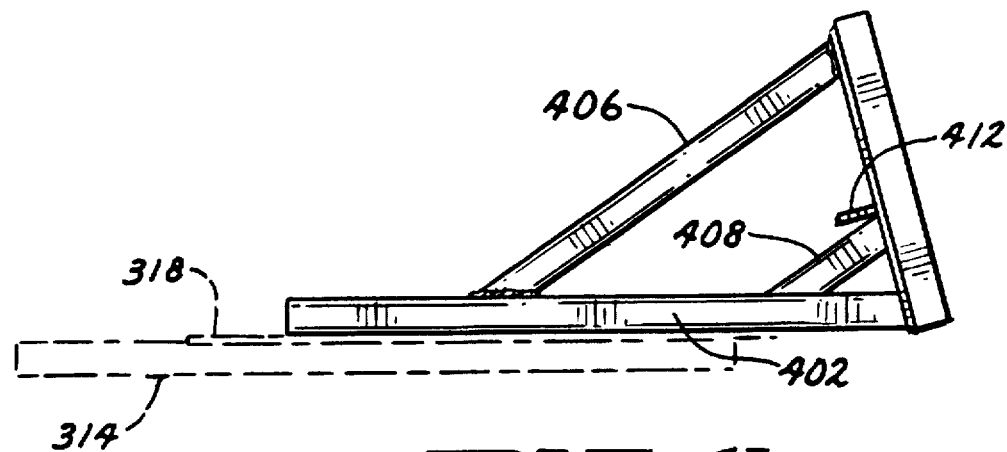
FIG. 41 is a side view of the support assembly of the fourth embodiment.
Figure 42:
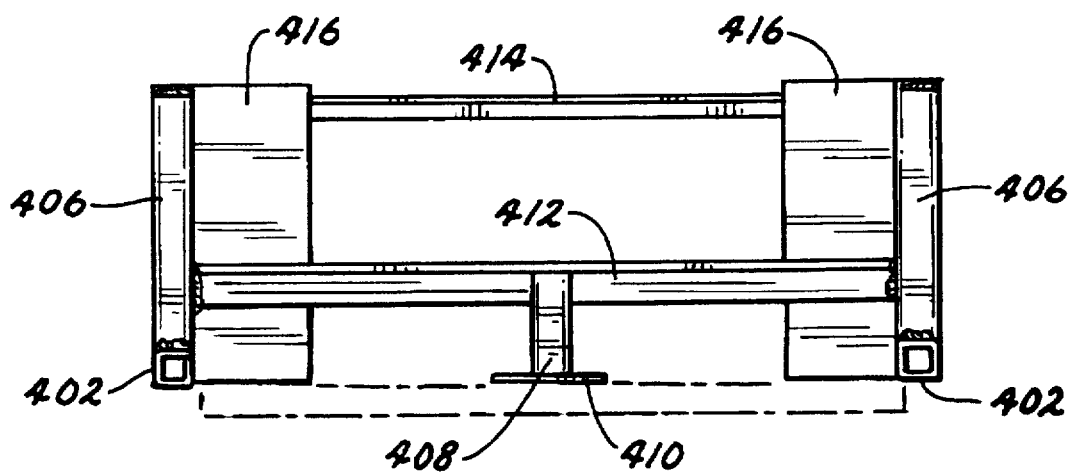
FIG. 42 is a front view of the support assembly of the fourth embodiment.

FIGS. 39–40 illustrate an alternate use of six spade ring assembly 304. Mounting assembly 400 includes two projecting arms 402 that connect as by bolts 404 to flange 318. Mounting assembly 400 also includes two diagonal supports 406 and a diagonal support element 408 welded to a mounting plate 410, also attached to flange 318 by bolts 404. This mounting assembly 400 is intended for attachment to a skid loader. As is well known, skid loaders of different brands each have different bolt patters for mounting to the loader arms, and different mounting plates are therefore required. The illustrated version includes a lower connecting element 412 and an upper connecting element 414. At each end is a mounting plate 416. Mounting assembly 400 permits a six spade ring assembly 304 to be attached to a skid loader, which includes many of the features of maneuverability and ease of use found in the earlier embodiments of the excavating and transplanting apparatus. A driving apparatus such as hammer 44 is still required to manually drive the spades mounted to ring assembly 304.

While the preferred embodiments of the invention have been described, it should be understood that various changes, adaptations and modifications may be made therein without departing from the spirit of the invention and the scope of the appended claims.

What is claimed is:

1. An apparatus for excavating and transplanting trees and other vegetation comprising:

at least two spade assemblies, each said spade assembly including a spade member slidably movable between a retracted position and an extended position, each said spade member having a spade blade and a spade handle extending from said spade blade;

a ring assembly to which are removably mounted said spade assemblies, said ring assembly including a strength member, a first gate member and a second gate member;

manually actuable driving means for urging said spade members into the soil, said driving means being engageable with said spade handle of said spade member;

means for raising and lowering said ring assembly;

a support structure to which said ring assembly is removably mounted; and means for attaching said support structure to a transporting means for transporting the excavating and transplanting apparatus from one location to another.

2. The excavating and transplanting apparatus described in claim 1, further comprising:

means for transporting the excavating and transplanting apparatus from one location to another.

3. The excavating and transplanting apparatus described in claim 2, wherein said means for transporting the excavating and transplanting apparatus from one location to another comprises at least two wheels attachable to said support structure using said means for attaching said support structure to a transporting means.

4. The excavating and transplanting apparatus described in claim 3, further comprising:

at least two handle bars attached to said support structure, whereby said handle bars may be gripped by the user of the excavating and transplanting apparatus to reposition the apparatus by rolling it on said wheels.

5. The excavating and transplanting apparatus described in claim 1, further comprising:

said means for raising and lowering said ring assembly being attached to and cooperating with said support structure.

6. The excavating and transplanting apparatus described in claim 5, said means for raising and lowering said ring assembly further comprising:

a lift member attached to said ring assembly;

a rack fixedly attached to said lift member; and a hand crank assembly engageable with said rack, said hand crank assembly being attached to said support structure.

7. The excavating anti transplanting apparatus described in claim 5, said means for raising and lowering said ring assembly further comprising:

at least one hydraulic cylinder mounted to said support structure, said hydraulic cylinder being powered by a motorized pump.

8. The excavating and transplanting apparatus described in claim 1, further comprising:

means for permitting transporting of the excavating and transplanting apparatus from one location to another; and trailer means attachable to said support structure, whereby said trailer means may be attached to a towing vehicle for transporting the excavating and transplanting apparatus from one location to another.

9. The excavating and transplanting apparatus described in claim 8, wherein said trailer means further comprises:

a trailer tongue member;

a transporting support member pivotally attached to said trailer tongue member; and means for releasably attaching said trailer means to said support structure.

10. The excavating arid transplanting apparatus described in claim 9, further comprising:

at least two trailer support members attached to said trailer tongue member, whereby said means for releasably attaching said trailer means to said support structure are fastened to said support structure, and releasably engage corresponding members on said transporting support member and said at least two trailer support members, respectively.

11. The excavating and transplanting apparatus described in claim 10, wherein said means for permitting transporting of the excavating and transplanting apparatus from one location to another comprises at least two wheels attachable to said support structure using said means for attaching said support structure to a transporting means.

12. The excavating and transplanting apparatus described in claim 8, wherein said trailer means further comprises:

a trailer tongue member;

a transporting support member attached to said trailer tongue member; and means for pivoting said support structure between a traveling position and an upright position, whereby when in said traveling position, said support structure bears against said transporting support member.

13. The excavating and transplanting apparatus described in claim 12, wherein said means for pivoting said support structure between a traveling position and an upright position comprises a hydraulic cylinder attached on its first end to said trailer tongue member and on its second end to said support structure, said hydraulic cylinder being powered by a motorized pump.

14. The excavating and transplanting apparatus described in claim 13, wherein said means for permitting transporting of the excavating and transplanting apparatus from one location to another comprises at least two wheels attachable to said support structure using said means for attaching said support structure to a transporting means.

15. The excavating and transplanting apparatus described in claim 8, wherein said means for permitting transporting of the excavating and transplanting apparatus from one location to another comprises at least two wheels attachable to said support structure using said means for attaching said support structure to a transporting means.

16. The excavating and transplanting apparatus described in claim 15, wherein said trailer means further comprises:

a trailer tongue member;

a transporting support member attached to said trailer tongue member;

a first extendable trailer element having a first end and a second end, said first end of said first extendable trailer element being attached to said support structure adjacent where the first of said wheels attaches to said means for attaching said support structure to a transporting means, and said second end of said first extendable trailer element being attached to an intermediate portion of said trailer tongue member; and a second extendable trailer element having a first end and a second end, said first end of said second extendable trailer element being attached to said support structure adjacent where the second of said wheels attaches to said means for attaching said support structure to a transporting means, and said second end of said second extendable trailer element being attached to an intermediate portion of said trailer tongue member.

17. The excavating and transplanting apparatus described in claim 16, further comprising:

a hydraulic cylinder mount, to said first extendable trailer element, said hydraulic cylinder being powered by a motorized pump.

18. The excavating and transplanting apparatus described in claim 8, wherein said trailer means further comprises:

an extendable trailer tongue member; and a transporting support member attached to said trailer tongue member.

19. The excavating and transplanting apparatus described in claim 18, further comprising:

a hydraulic cylinder mounted to said extendable trailer tongue member, said hydraulic cylinder being powered by a motorized pump.

20. The excavating and transplanting apparatus described in claim 1, wherein each said spade assembly further comprises:

a longitudinal rib member projecting outwardly from said spade handle of said spade member;

a longitudinal spade connector extending between said spade handle and said spade blade, said spade connector being spaced from and collinear with said longitudinal rib member; and a cylindrical spade guide having a longitudinal slot thereon, through which passes said longitudinal spade connector and said longitudinal rib member.

21. The excavating and transplanting apparatus described in claim 20, further comprising:

a retaining ring having a cutout, said retaining ring being rotatably mounted to the top of said cylindrical spade guide with said spade handle passing therethrough, whereby said cutout of said retaining ring may be rotatably positioned to permit said rib member of said spade handle to pass therethrough, and may be rotatably positioned to pass between said spade connector and said rib member of said spade handle to retain said spade member in said retracted position.

22. The excavating and transplanting apparatus described in claim 21, wherein each said spade assembly further comprises:

a mounting assembly removably attached to said ring assembly.

23. The excavating and transplanting apparatus described in claim 22, wherein said mounting assembly further comprises:

at least two support members fixedly attached to said cylindrical spade guide; and a mounting bracket fixedly attached to said support members, said mounting bracket being removably attachable to said ring assembly.

24. The excavating and transplanting apparatus described in claim 1, wherein each said spade assembly further comprises:

a mounting assembly removably attached to said ring assembly.

25. The excavating ant transplanting apparatus described in claim 24, wherein said mounting assembly further comprises:

at least two support members fixedly attached to said spade assembly; and a mounting bracket fixedly attached to said support members, said mounting bracket being removably attachable to said ring assembly.

26. The excavating and transplanting apparatus described in claim 1, wherein:

said spade blade is generally concave, said concave portion facing away from said spade handle extending from said spade member.

27. The excavating and transplanting apparatus described in claim 26, further comprising:

a blade handle extending between and fixedly attached to opposite portions of said spade blade.

28. The excavating and transplanting apparatus described in claim 26, wherein said spade blade further comprises:

first, second and third parallel break lines dividing said spade blade into first, second, third and fourth blade sections.

29. The excavating and transplanting apparatus described in claim 28, further comprising:

a blade handle extending between and fixedly attached to said first blade section and said fourth blade section of said spade blade.

30. The excavating and transplanting apparatus described in claim 1, further comprising a blade extractor tool assembly cooperative with said spade assemblies for moving said spade member from said extended position to said retracted position.

31. The excavating and transplanting apparatus described in claim 30, further comprising:

a radially extending knob member fixedly attached to the end of said spade arm of said spade member distal from said spade blade.

32. The excavating and transplanting apparatus described in claim 31, wherein said blade extractor tool assembly comprises:

a rod extender member:

a bar member releasably attachable to and selectively positionable with respect to said rod extender member, whereby said bar member may be positioned with varying amounts thereof extending from said rod extender member; and a lever arm pivotally attached to said rod extender member, said lever arm having a hook portion removably engageable with said radially extending knob member of said spade member, whereby with said spade member in said extended position, said rod extender member may be positioned against a fixed surface such as said ring assembly on one end with said hook portion of said lever arm engaging said radially extending knob member to extract said spade member frown its said extended position to its said retracted position.

\* \* \* \* \*